(12) United States Patent
Nakamura et al.

(10) Patent No.: US 7,559,070 B2
(45) Date of Patent: Jul. 7, 2009

(54) MOVING IMAGE DISTRIBUTION SYSTEM, MOVING IMAGE DIVIDING SYSTEM, MOVING IMAGE DISTRIBUTION PROGRAM, MOVING IMAGE DIVIDING PROGRAM, AND RECORDING MEDIUM STORING MOVING IMAGE DISTRIBUTION PROGRAM AND/OR MOVING IMAGE DIVIDING PROGRAM

(75) Inventors: Jun Nakamura, Chiyoda-ku (JP); Hideo Saito, Chiyoda-ku (JP); Kazuhiro Hiramoto, Chiyoda-ku (JP); Yuichi Sei, Chiyoda-ku (JP); Sergey Kozhevnikov, Chiyoda-ku (JP); Takuro Matsuda, Chiyoda-ku (JP); Jun Togo, Chiyoda-ku (JP); Shingo Ono, Chiyoda-ku (JP); Seiya Kato, Chiyoda-ku (JP); Yutaka Arakawa, Chiyoda-ku (JP)

(73) Assignee: Global Point Systems Inc., Tokyo (JP)

( * ) Notice: Subject to any disclaimer, the term of this patent is extended or adjusted under 35 U.S.C. 154(b) by 328 days.

(21) Appl. No.: 10/565,983

(22) PCT Filed: Jul. 27, 2004

(86) PCT No.: PCT/JP2004/010645

§ 371 (c)(1),
(2), (4) Date: Feb. 21, 2006

(87) PCT Pub. No.: WO2005/022912

PCT Pub. Date: Mar. 10, 2005

(65) Prior Publication Data

US 2006/0195702 A1     Aug. 31, 2006

(30) Foreign Application Priority Data

Jul. 28, 2003    (JP)  .............................. 2003-280664

(51) Int. Cl.
*H04N 7/167* (2006.01)
*H04N 7/10* (2006.01)

(52) U.S. Cl. .............................. 725/31; 725/32; 725/86; 380/210

(58) Field of Classification Search .................. 725/93, 725/32–36, 31; 380/210, 211
See application file for complete search history.

(56) References Cited

U.S. PATENT DOCUMENTS 6,036,601 A * 3/2000 Heckel ........................ 463/42
6,094,679 A * 7/2000 Teng et al. .................. 709/220

(Continued)

*Primary Examiner*—John W Miller
*Assistant Examiner*—Robert Hance
(74) *Attorney, Agent, or Firm*—Manabu Kanesaka

(57) ABSTRACT

A moving image distribution system, wherein the user can view content moving images at no charge, and the provider of the content moving images can prevent a drain of the moving image contents and can protect the copy right thereof, as a copy right holder, without fail. The moving images are divided, along a time axis, into two master and slave nonreproducible moving image files. The slave moving image file (small file) is encrypted based on CM file data in which a predetermined CM element has been incorporated. In response to a reproduction request of a user terminal that possesses the master moving image file (main file) in advance, the slave moving image file is distributed with the CM moving images to the user terminal via a network line such as the Internet.

15 Claims, 11 Drawing Sheets

U.S. PATENT DOCUMENTS

| | | |
|---|---|---|
| 2002/0009137 A1* | 1/2002 | Nelson et al. ............ 375/240.1 |
| 2002/0010759 A1* | 1/2002 | Hitson et al. ................ 709/219 |
| 2002/0124249 A1* | 9/2002 | Shintani et al. ............... 725/32 |
| 2004/0148424 A1* | 7/2004 | Berkson et al. ............. 709/236 |
| 2004/0196975 A1* | 10/2004 | Zhu et al. ................... 380/258 |

* cited by examiner

MOVING IMAGE DISTRIBUTION SYSTEM, MOVING IMAGE DIVIDING SYSTEM, MOVING IMAGE DISTRIBUTION PROGRAM, MOVING IMAGE DIVIDING PROGRAM, AND RECORDING MEDIUM STORING MOVING IMAGE DISTRIBUTION PROGRAM AND/OR MOVING IMAGE DIVIDING PROGRAM

FIELD OF THE INVENTION

The present invention relates to a moving image distribution technology for distributing a moving image to a user terminal connected to a network line such as the Internet, and more specifically, to a moving image distribution technology enabling a user to view a moving image free of charge and a provider of the moving image to reliably protect the copyright of the moving image.

BACKGROUND OF THE INVENTION

Popularization of the Internet has made it possible for any one to easily obtain necessary information via a computer. Especially, in these days megabit-class high-speed lines such as xDSL (Digital Subscriber Line) and FTTH (Fiber To The Home) are becoming popular in general households, and contents which used to be distributed through a physical medium such as a CD-ROM tends to use a digital medium for on-line distribution via the high-speed line.

One typical example of the service taking advantage of the feature of the high-speed Internet may be distribution of a moving image. In general, there are two distribution methods for the moving image; a downloading type for replaying the moving image after downloading all the moving image data to a personal computer, and a streaming type for replaying the moving image in real time while downloading the moving image.

In the case of the former, namely the downloading type, on one hand the moving image can be advantageously replayed without a pause because the moving image data is once stored in the personal computer, and on the other hand, since the management of the distributed moving image content is transferred to the user side, the moving image content may be secondarily used by unauthorized copying and the like to violate the copyright of the moving image content.

In the case of the latter, namely the streaming type, while the secondary use described above can be prevented since only a key file including information on the storage location of the moving image content remains in the user terminal but not the actual moving image content remains therein, it is necessary to make the speed of the moving image data transmission faster than the speed of replaying the motion. Namely, when the transmission speed is slower than the replaying speed, the moving image may be replayed intermittently due to the data buffer to make the user uncomfortable.

As described above, either of the downloading type and the streaming type has good and bad points in distribution of the moving images. An example of a moving image distribution method making good use of the advantages of the downloading type and the streaming type is described in patent document 1. Patent document 1 describes a method of dividing a moving image content into two not-producible moving image files and decrypting the same with a decryption key.

This method enables the user to view the moving image smoothly like in the downloading type by taking the divided moving image data into a personal computer, receiving the decryption key from a service provider server upon authorization, and decrypting the moving image data.

However, while the moving image distribution method described above is suitable for the downloading type distribution, the following problem remains when the method is applied to the streaming type distribution. Namely, since the moving image file is divided simply along the time axis, the method described above can distribute the moving image file in an not-producible state, but the size of the moving image file is not in consideration.

As described above, since the streaming replay distributes a lighter moving image file to the user terminal first and distributes a heavier moving image file on-line, the server has a heavy load during the distribution, and the load increases as the number of access to the server increases. Therefore, since both files have large capacities in the method described above, it is not possible to reduce the load applied to the server during the distribution.

Primarily, since the downloading type distribution distributes all the moving image files to the user terminal, the number of the files stored in the hard disc (recording device) in the user terminal is limited. Also from such a view point, the streaming type of the moving image distribution method recently tends to be preferred to the download type.

Also, the decryption key is distributed to the user terminal for replaying the moving image content, but a copy data of the decryption key (namely, a concave data assuming the decryption key data as a convexity) may remain in the recording device (such as a hard disc) in the user terminal, and the decryption key may be copied based on the copy data, Patent document 1: Japanese patent publication No. 2002-353957

SUMMARY OF THE INVENTION

Problem to be Solved by the Invention

The problem to be solved by the present invention is to provide a moving image distribution technology enabling a user to view a moving image free of charge and a provider of the moving image to reliably protect the copyright of the moving image.

Means for Solving the Problem

In order to solve the problem described above, the present invention has some features as described below. At first, in claim 1, the present invention provides a moving image distribution system for distributing a prespecified moving image to a user terminal connected to the system via a network such as the Internet, and the system comprises a moving image distributing unit for distributing the moving image to two not-reproducible files along the time axis; an encrypting unit for encoding either one of the divided moving image together with data for a CM file including a prespecified CM (advertisement) element incorporated therein; a moving image distributing unit for distributing the user terminal either one of the moving image files produced by the encrypting unit together with the CM file in response to a request for reproduction from the user terminal storing therein either another one of the divided moving image files; and a reproducing unit for combining the two moving image files and the CM file distributed to the user terminal and reproducing the combined files.

In claim 9, the present invention provides a moving image distribution system according to claim 2 for distributing a prespecified moving image to a user terminal connected to the system via a network such as the Internet, and the system having a service provider server comprising a moving image diving unit for dividing the moving image two not-reproducing moving image files, namely a main one and a slave one; a main moving image file storing section for storing therein the main moving image file; a slave moving image file storing section for storing therein the slave moving image; and a CM file storing section for storing therein a CM file including a prespecified CM element incorporated therein; and the system furthermore comprises a first step of sending a demand for distributing the moving image from the user terminal to the service provider server; a second step of acquiring, in response to the demand for distribution, the main moving image file for the moving image from the main moving image file storing section and distributing the main moving image file to the user terminal; a third step of sending a demand for reproduction of the main moving image file from the user terminal; a fourth step of acquiring, in response to the demand for reproduction, the slave moving image file matching the main moving image file from the slave moving image file storing section; a fifth step of acquiring the CM file from the CM file storing section and encrypting the slave moving image file based on data in the CM file; a sixth step of distributing the encrypted slave moving image file together with the CM file to the user terminal; and a seventh step of combining the two moving image files distributed to the user terminal and the CM file with a prespecified reproducing unit and reproducing the combined files.

In claim 11, the present invention provides a moving image distribution system for distributing a prespecified moving image to a user terminal connected to the system via a network such as the Internet, and the system comprises a service provider server comprising a moving image contents provider server having the moving image, a sponsor server having a CM file with a prespecified advertisement element incorporated therein, and a moving image dividing unit for dividing the moving image to two not-reproducible files, namely a main one and a slave one, along the time axis, and the moving image distribution system is furthermore characterized in that the moving image contents provider server has a main moving image file storing section for storing a main moving image file obtained after division by the moving image dividing unit; the service provider server has a slave moving image file storing section for storing thereon a slave moving image file obtained after division by the moving image dividing unit, an encrypting unit for either one of the main moving image file and the slave moving image file based on data for the CM file, and a CM file storing section for storing therein the CM moving image distributed from the sponsor server. The system furthermore comprises a first step of sending a demand for distributing the moving image from the user terminal to the service provider server; a second step of acquiring, in response to the demand for distribution, the main moving image file for the moving image from the main moving image file storing section and distributing the main moving image file to the user terminal; a third step of sending a demand for reproduction of the main moving image file from the user terminal; a fourth step of acquiring, in response to the demand for reproduction, the slave moving image file matching the main moving image file from the slave moving image file storing section; a fifth step of acquiring the CM file from the CM file storing section and encrypting the slave moving image file based on data in the CM file; a sixth step of distributing the encrypted slave moving image file together with the CM file to the user terminal; and a seventh step of combining the two moving image files distributed to the user terminal and the CM file with a prespecified reproducing unit and reproducing the combined files.

In claim 2, the moving image dividing unit compresses data for a moving image so that a total of file capacities of the two moving image files is smaller than a file capacity for the moving image, and also dividing the moving image so that a file capacity of the main moving image file is larger than that of the slave moving image file.

In claim 3, the encrypting unit computes an exclusive logical sum (XOR) between a data bit array for the CM file and a data bit array for the divided moving image file and encrypting the moving image file.

In claim 4, the moving image distribution system further comprises a user information storing section for storing therein various types of user information concerning users including service providers (managers), users, moving image contents providers, and sponsors; and a user certifying engine for certifying access to the service provider server based on the user information, and the moving image dividing unit acknowledges a demand for dividing the moving image only when a user is authenticated as a service provider or a moving image contents provider.

In claim 10, the service provider server furthermore comprises a CM file acquiring unit for acquiring the CM file from the CM file storing section based on the user information, and the CM file acquiring unit selects a CM file demanded by the user from the CM file storing section based on the user information and provides the CM file to the encrypting unit.

In claim 5, the reproducing unit comprises a decoder for decoding the main s moving image file and the slave moving image file both not-reproducible to the reproducible moving image, and a combining unit for combining one of the encrypted moving image files (slave moving image file) together with the CM file again by executing the exclusive logical sum (XOR) processing, and the reproducing unit combines the CM file with the moving image files after checking that the CM file has been reproduced, and starts up the decoder to decode the main moving image file and the slave moving image file to the reproducible moving image.

In claim 6, the service provider server comprises a reproducing unit storing section for storing therein the reproducing unit, and executes a processing procedure comprising a searching step of searching whether the reproducing unit is present on the user terminal or not, and a reproducing unit distributing step of distributing the reproducing unit to the user terminal.

In claim 7, the reproducing unit further comprises a user information storing section for storing therein user information concerning the user, and distributes the user information to the user information storing section in the serve provider server.

In claim 12, the present invention provides a moving image distribution program for distributing a prespecified moving image to a user terminal connected to a moving image distribution system via a network line such as the Internet, and the program comprises a moving image dividing step of dividing the moving image to two not-reproducible moving image files along the time axis;

an encrypting step of encrypting data either one of the divided two moving image files together with data for a CM file including a prespecified CM element incorporated therein; and a moving image distributing step of distributing, in response to a demand for reproduction from the user terminal storing therein either another one of the moving image files, the other one of the moving image files together with the CM moving image to the user terminal.

The present invention also provides a moving image dividing system. Namely, the present invention provides a moving image dividing system comprising a moving image dividing unit for dividing a reproducible moving image to two moving image files, namely a main one and a slave one, along the time axis, and the moving image dividing unit comprises a frame dividing unit for acquiring the moving image frame by frame and dividing each frame for a first frame including only frame information for the frame, and a second frame including the frame information and frame information for a preceding frame; a bit dividing unit for dividing the first frame to lower 7 bits and a top bit; another frame dividing unit for dividing the second frame to a first code including only the second frame information, and a second code including the second frame information and frame information for a preceding frame; a coefficient extracting unit for subjecting the first code to discrete cosine transform to extract an AC coefficient and a DC coefficient thereof respectively; and a file constructing section for constructing the main moving image file by combining the second code, the AC coefficient, and the lower 7 bits of the first frame and also for constructing the slave moving image file by combining the DC coefficient and the top bit of the first frame.

In claim 14, the present invention provides a moving image distribution system for distributing a prespecified moving image to a user terminal connected to the system via a network such as the Internet, and the system comprises a service provider server having a moving image dividing unit for dividing a moving image distributed from a moving image contents provider to two not-reproducible moving image files, namely a main one and a slave one, along the time axis and also for incorporating a CM file distributed from a sponsor in either one of the divided moving image files. In the moving image distribution system, the server provider server distributes the moving image file to the user terminal and also presents a CM advertisement fee associated with distribution of the moving image file to the sponsor.

In claim 15, the present invention provides a moving image distribution system for distributing a prespecified moving image to a user terminal connected to the system via a network such as the Internet, and the system comprises a moving image contents provider server storing therein the moving image; a sponsor server storing therein a CM file having a CM file with an advertisement element incorporated therein; and a serve provider server having a moving image for dividing the moving image to two not-reproducible moving image files, namely a main one and a slave one, along the time axis. Furthermore in the moving image distributing system, the server provider server has a CM management engine including a counting section for counting times of distribution of either one or both of the main and slave moving image files; a CM distribution managing section for managing log data for distribution of the CM file distributed together with the moving image file; and a CM information preparing section for computing distribution information for the CM file according to times of distribution of the CM file and the distribution log data. Furthermore the system comprises a counting step of counting times of distribution of the distributed moving image contents in response to a demand for distribution from the user terminal on the counting section; a CM information preparing step of preparing acquiring a count from the counting section, acquiring the log data for distribution from the CM distribution managing section, and preparing CM distribution information from the count as well as from log data for distribution in the CM information preparing section; and a distribution log data notifying step of notifying the moving image contents provider server and/or the sponsor server of the distribution information.

The present invention provides a moving image dividing program having a moving image dividing step of dividing a reproducible moving image to two not-reproducible moving image files, namely a main one and a slave one, and in the program, the moving image dividing step comprises a frame dividing step of acquiring the moving image frame by frame and dividing each frame to a first frame including only the frame information and a second frame including the frame information and information concerning a preceding frame; a bit dividing step of dividing the first frame to lower 7 bits and a top bit; a code dividing bit of dividing the second frame to a first code including only the second frame information and frame information including the second frame information and frame information concerning a preceding frame; a coefficient extracting step of subjecting the first code to discrete cosine transform to extract an AC coefficient and a DC coefficient thereof; and a file constructing step of constructing the main moving image by combining the second code, the ac coefficient, and the lower 7 bits of the first frame, and also of constructing the slave moving image file by combining the DC coefficient and atop bit of the first frame.

The present invention provides a moving image dividing system having a moving image dividing unit for dividing a reproducible moving image to two not-reproducible moving image files, namely a main one and a slave one, along the time axis. In the system, the moving image dividing unit comprises a frame dividing unit for acquiring the moving image frame by frame and dividing each frame to a first frame including only the frame information and a second frame including the frame information and frame information concerning a preceding frame; a first block extracting unit for extracting a block from the first frame; a first coefficient extracting section for extracting a DC coefficient and an AC coefficient from the block extracted by the first block extracting unit; a second block extracting unit for extracting a block from the second frame; a second coefficient extracting section for acquiring a DC coefficient and an AC coefficient from the block extracted by the second block extracting unit; a filtering section for acquiring a portion of the bit number as a filter factor by subjecting a DC coefficient for the preceding frame extracted from each coefficient extracting section to the exclusive logical sum (XOR) processing; a first file constructing section for subjecting the AC coefficient extracted by the first coefficient extracting section and the filter factor produced by the filtering section to the exclusive logical sum (XOR) processing; and a second file constructing section for subjecting the AC coefficient extracted by the second coefficient extracting section and the filter factor produced by the filtering section to the exclusive logical sum (XOR) processing.

The filter factor comprises lower 8 bits.

The present invention provides a moving image dividing program having a moving image dividing step of dividing a reproducible moving image to two not-reproducible moving image files, namely a main one and a slave one, along the time axis, and in the program, the moving image dividing unit comprises a frame dividing step of acquiring the moving image frame by frame and dividing each frame to a first frame including only the frame information and a second frame including the frame information and frame information concerning a preceding frame; a first block extracting step of extracting a block from the first frame; a first coefficient extracting step of extracting a DC coefficient and an AC coefficient from the block extracted in the first block extracting step; a second block extracting step of extracting a block from the second frame; a second coefficient extracting step of extracting a DC coefficient and an AC coefficient from the block extracted in the second block extracting step;

a filtering step of acquiring a portion of the bit number as a filter factor by subjecting a DC coefficient for the preceding frame extracted from each coefficient extracting section to the exclusive logical sum (XOR) processing; a first file constructing step of subjecting the AC coefficient extracted in the first coefficient extracting step and the filter coefficient produced in the filtering step to the exclusive logical sum (XOR) processing; and a second file constructing step of subjecting the AC coefficient extracted in the second coefficient extracting step and the filter factor produced in the filtering step to the exclusive logical sum (XOR) processing.

In claim 13, the present invention also provides a recording medium in which the moving image distribution program and/or the moving image dividing program are stored. The recording medium available for the purpose described above includes, but not limited to, various types of memories such as a semiconductor memory, a magnetic disk, an optical disk such as a CD-ROM, and a DVD disk. Also a recording unit incorporated in a computer (such as a hard disk or a RAM disk) and other types of recording media capable of recording therein a program can be used in the present invention. Furthermore, the moving image distribution program and/or the moving image dividing program may be distributed through a digital network such as the Internet or satellite communications, and a terminal to which the program is distributed is also included in the recording medium according to the present invention.

Effect of the Invention

According to the embodiment described in claims 1, 9, and 11, since the moving image is divided into two not-producible moving image files, one of the moving image files is distributed to the user terminal before the other moving image file is distributed along with the CM file necessary to restore the moving image, whereby the moving image is restorable only with presence of the CM file, the user can enjoy the moving image free of charge any number of times on the condition of viewing the CM advertisement at the time of replaying the moving image. On the other hand, the copyright holder can simplify the management of the moving image and earn the royalty of the copyright by means of the advertising income by the CM advertisement.

The "file" used herein means a data used by various means according to the present invention, and the "means" means an execution unit executing the data along the prespecified computing steps. The "CM" means an information transmitting element incorporating a prespecified advertising element.

According to the embodiment described in claim 4, since a main moving image file with a larger capacity is distributed to the user terminal by downloading in advance, the server has only to distribute the slave moving image file and the CM file with smaller capacity by streaming to reduce the load on the server and consequently an increased number of access to the server does not affect the replaying speed of the moving image.

According to the embodiment described in claim 2, since the slave moving image file is not composed without the CM file, the CM file can be delivered to the user without fail.

According to the embodiment described in claim 4, since the certifying engine is provided separately so that no one but the moving image contents provider and the service provider can operate the moving image dividing engine, the security is further improved.

According to the embodiment described in claim 10, it is possible to effectively deliver the CM file suitable for the age and taste of the user.

According to the embodiment described in claim 5, the main moving image is replayed upon replaying the CM moving image, whereby showing the CM to the user reliably. By distributing the replaying means free of charge, the system can be broadly distributed to obtain a large number of users and increase the advertising income.

According to the embodiment described in claim 6, when the replaying means is not installed in the user terminal, the service provider server can automatically distribute the replaying means.

According to the embodiment described in claim 7, since the personal information of the user is saved in the replaying means, namely in the user terminal, the user can manage his personal information.

According to the embodiment described in claim 11, since the moving image can be divided into two main and slave moving image files along the time axis with the main moving image file having larger file capacity than the slave moving image file and the main moving image with the larger file capacity being distributed to the user terminal by downloading in advance, the server has only to distribute the slave moving image and the CM file with the smaller file capacity by streaming to reduce the load on the server, and consequently an increased number of access to the server does not affect the replaying speed of the moving image.

According to the embodiment described in claim 14, by collecting the CM advertising cost accompanying distribution of the moving image from the sponsor, not only the user can view the moving image free of charge but also the moving image contents provider can earn the royalty of the copyright.

According to the embodiment described in claim 15, having the CM managing engine including the counting unit counting the number of distribution of the moving image and the distribution managing unit managing the distribution log, the number of distribution of the CM can be managed according to the distribution count of the moving image not only to grasp the state of the CM distribution but also to manage the advertising income and payment associated with the CM.

According to an embodiment since the screen can be easily divided no matter the moving image is compressed or uncompressed and the dividing processing is executed by the unit of block extracting each block of the frame, redundant operations in the dividing processing can be reduced to reduce the load on the processor and to dramatically shorten the processing time.

EXPLANATIONS OF LETTERS OR NUMERALS

Figure 1:
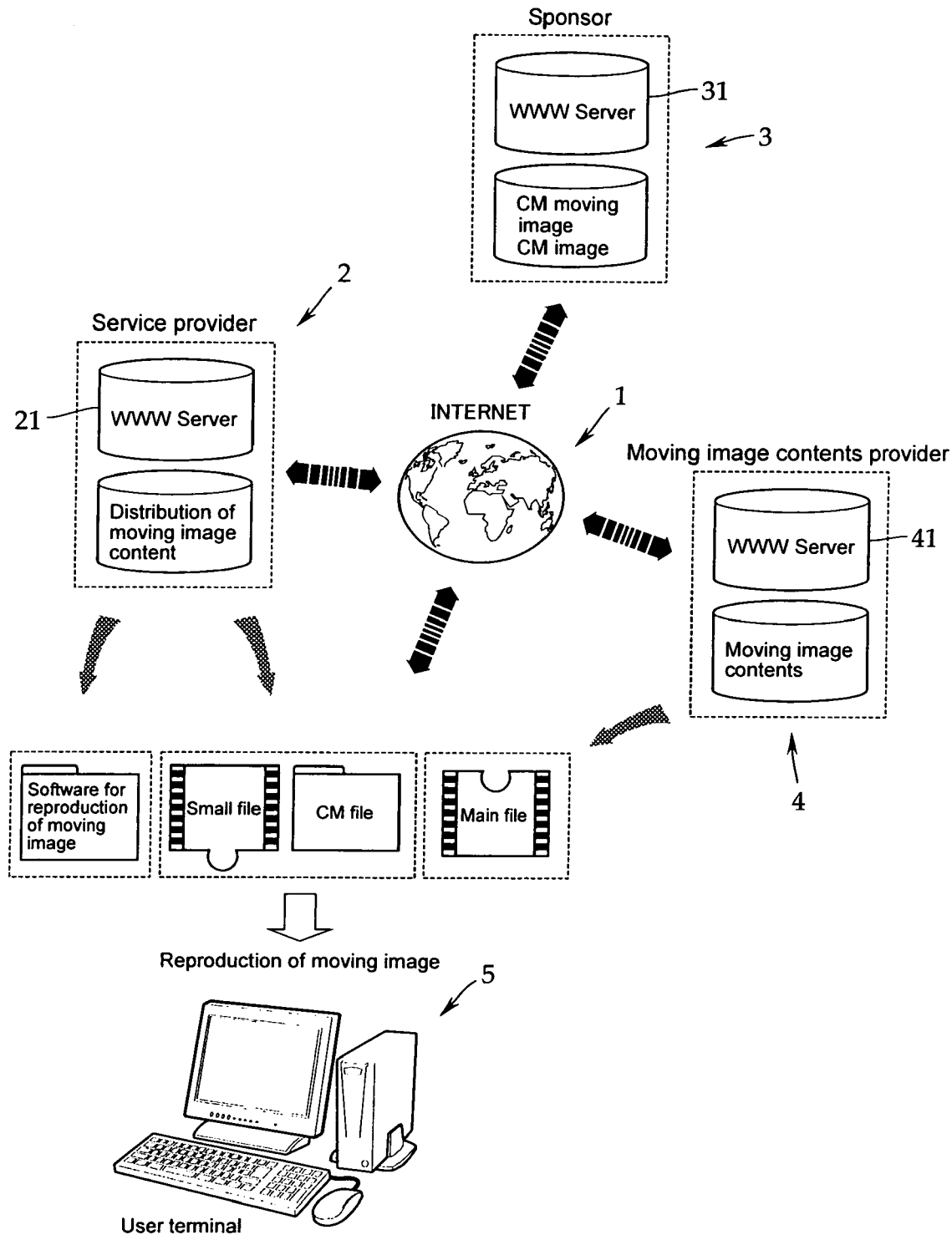
FIG. 1 is a block diagram showing a general system of the moving image distribution system according to an embodiment of the present invention.

1; Internet line (Network line)
2; Service provider server
3; Sponsor server
4; Moving image contents provider server
5; User terminal
21, 31, 41; WWW server
210; User certifying engine
220; Moving image dividing engine
230; Moving image distributing engine
240; CM distributing engine

DESCRIPTION OF THE PREFERRED EMBODIMENT

Next, the preferred embodiment of the present invention is explained with reference to the drawings. FIG. 1 schematically shows connections in a moving image distribution system according to the present invention. As shown in FIG. 1, the moving image distribution system includes a service provider server 2, a sponsor server 3, a moving image contents provider server 4, and a user terminal 5 each connected to an internet line 1.

With the embodiment, the service provider server 2, the sponsor server 3, and the moving image contents provider server 4 are provided with WWW servers 31, 41, 51 respectively, and each of the WWW servers 31, 41, 51 is in fact connected with the Internet line 1.

According to the embodiment, the user terminal 2 and the servers are mutually connected through a network line including the Internet line 1, but the network line may also include an intranet line connected via LAN (Local Area Network). The connecting unit with the line may also be not only an xDSL line or various fiber lines but also a telephone line and a wireless line as well as satellite communication, and is not limited as long as the terminals can exchange data one another.

Figure 2:
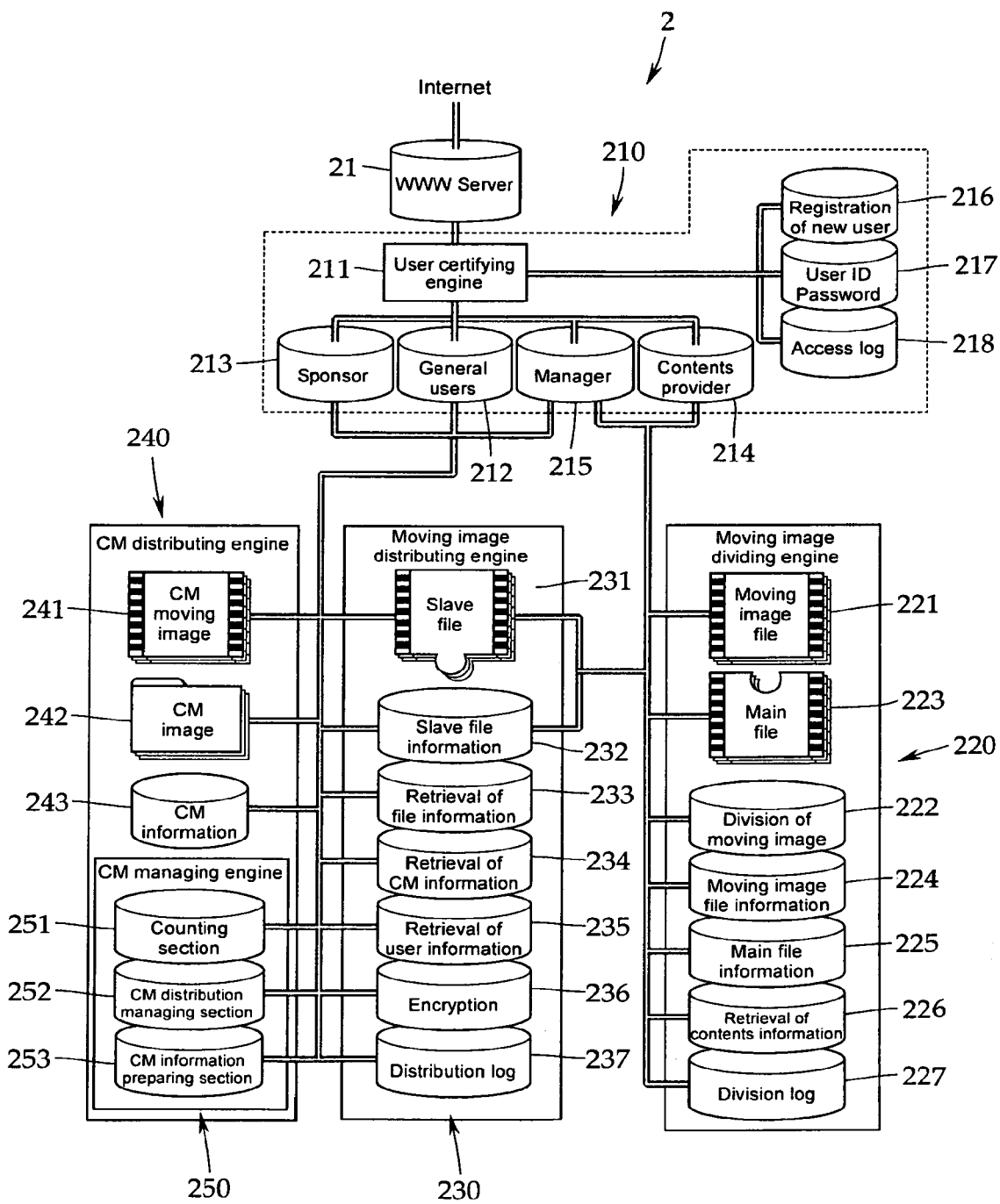
FIG. 2 is a system block diagram showing a service provider server with the moving image distribution system described above.

Next, a specific configuration of each terminal is explained. FIG. 2 shows the system configuration of the service provider server 2. The service provider server 2 includes a WWW server 21 connected with the Internet line 1, a user certifying engine 210 accepting a request for access to the service provider server 2 and executing an authorization of the access request, a moving image dividing engine 220 dividing a moving image into main and two not-producible slave moving image files, a moving image distributing engine 230 distributing a slave moving image file, and a CM distributing engine 240 distributing a CM file along with the moving image file, ail of which are connected via information transmission path.

The user certifying engine 210 is what is called a gate server provided at the gate of the service provider server 2, and is actually included in the WWW server 21.

The system configuration of the user certifying engine 210 is configured with a user authorization unit 211 executing a user authorizing step by checking user information inputted from the user terminal 5 with authorization data stored within the system, a user information storing unit 212 storing various account information of the user, a sponsor information storing unit 213 storing various account information of the contracted sponsor, a contents provider information storing unit 214 storing various account information of the contents provider having the copyright of the moving image content, an administrator information storing unit 215 storing various account information of the service provider (administrator), a new user registering unit 216 creating various account information of the new user and registering the account information in each storing unit 212 to 215 when the user authorization unit 211 recognizes a first access (new user), an account saving unit 217 saving a user ID and a password of each user, and an access log managing unit 218 managing an access log to the user certifying engine 210.

The user authorizing unit 211 is a computing unit executing the authorization to various users requesting access to the service provider server and assigned with recording space and memory sufficient for the authorization processing.

Each of the storing units 212 to 215, the account saving unit 217, and the log managing unit 218 stores not only various account information but also information files necessary for the user to access the service provider server, each of which has a sufficient recording space. The file name, update time, and link information are separately described on each information file and stored in a layered state according to the user name and the type.

The user authorizing unit 211 is connected to other units via information transmission path, and requests an input of the user information to a requested terminal (user terminal 4 and the like) in the case of receiving a request for connection from the user terminal 5, the contents provider server 4, and the like.

When the user information (for instance, the account ID and the password) is inputted from the requesting terminal, the account saving unit 217 is searched based on the inputted information, and if the corresponding account information is present, the unit accesses the location storing the account information (user information storing unit 212 and the like) to obtain the user information, reads the environment for usage by the user (for instance, type of the OS (Operating System) or the browser used by the user or the connecting environment), and distributes the same to each engine (moving image dividing engine 220, moving image distributing engine 230, CM distributing engine 240) to prepare for distribution of the moving image.

The user authorizing unit 211 searches the account saving unit 217 based on the input information inputted from the terminal requested for connection, and, if it is determined "no applicable account", requests user registration request to the new user registering unit 216 to request the terminal requested for connection to enter the new user information.

In this embodiment, an example of the inputted user information may be, in the case of the user terminal 5, simple information such as the name and email address, and main registering information is stored in a user information storing unit 543 provided in a replaying software 54 (see FIG. 5) described later. In the case of the sponsor or the moving image contents provider, the information may be the name of the responsible person, the company name, the address, the section, the email address, and the like.

When the new user information is obtained from the requested terminal, the account storing unit 217 is searched again and a new account ID and password not existing in the account storing unit 217 is issued, when the new user information belongs to the user terminal 5, the user information is stored in the user information storing unit 212, in the case of the account information of the contracted sponsor, the information is stored in the sponsor information storing unit 213, and in the case of the copyright holder, the information is stored in the contents provider information storing unit 214. Further, the embodiment also includes the administrator information storing unit 215 storing various account information of the service provider (administrator). Also, the embodiment transmits the access logs associated with the series of account calling operation and the new user registering operation described above to the access log managing unit 218.

Afterward, a notice of completion of issuing the new account ID and the password is distributed to the user terminal 5. With this embodiment, the information exchange for the new user registration is executed in an on-demand style between the user terminal 5 and the user certifying engine 210, but, for instance, the new user information may be transmitted to an email address described by the user after execution of the registration processing based on the information obtained by the new user information, using a dedicated email server further provided in the WWW server 21 in consideration of the network security.

In order to prevent from hacking such as leaking or tapping user information of each user and interception as well as cracking such as falsifying or alteration of data and system destruction, the user certifying engine 210 is internally provided with a security means. An example of the preferred security means is an advanced encryption technology such as 128-bit SSL (Secure Socket Layer), but any other method of preventing intrusion from the outside can be selected for use.

Next, the moving image dividing engine 220 includes a moving image file storing unit 221 storing a reproducible original moving image distributed by the moving image contents provider for the moving image dividing processing, a moving image dividing unit 222 dividing the original moving image into the main and slave two not-producible moving image files using a prespecified dividing system, a main moving image file storing unit 223 storing the main moving image file (main file) larger of the two moving image files divided by the moving image dividing unit 222, a moving image file information storing unit 224 storing various moving image information including the title, the performance time, and the age limit of the original moving image, a main moving image file information storing unit 225 storing the dividing information of the main moving image file, a file name of the opponent slave moving image file, and also decoding information required for decoding each of the moving image files, a content information searching unit 226 executing the search for the original moving image and each of the divided main and slave moving image files, searching files, and a dividing log saving unit 227 saving the record of access to the moving image dividing engine 220 as well as the dividing log in the moving image dividing unit 222.

The moving image file storing unit 221 stores a lot of different moving images including what is captured from an image in a digital video, a CG (Computer Graphics) moving image, a movie and a video clip, and the moving image file storing unit 221 has a recording space sufficient for storing the lot of moving images therein.

With the embodiment, the moving image file storing unit 221 is an internal recording unit such as a hard disc stored in the moving image dividing engine 220, but a lot of different original moving images may be stored in an external recording medium such as a DVD-ROM (including RW/RAM) to be read by the moving image dividing engine 220.

In this case, the moving image file storing unit 221 may be further provided with a capturing means for capturing a moving image from an externally connected device. Further, in order to facilitate management of the moving image owned by the service provider (administrator), the moving image file storing unit 221 may store a thumbnail moving image recording the beginning of the moving image.

The moving image dividing unit 222 is a computing unit having a moving image dividing system for dividing the original moving image into main and slave two not-producible moving image files and a moving image dividing program for driving the moving image dividing system, and assigned with recording space and memory sufficient for the moving image dividing processing.

The moving image dividing unit 222 compresses each of the divided main and slave moving image files so that the total file capacity of the two files is smaller than the file capacity of the original moving image file and that the file capacity of the main moving image file is larger than the file capacity of the slave moving image file.

Namely, with the embodiment, the moving image dividing unit 222 (more specifically, the moving image dividing system possessed by the moving image dividing unit 222) compresses an inputted original moving image to convert to MPEG format (Motion Picture Experts Group), executes a prespecified computing step in the process of the conversion to MPEG format, and divides the moving image into the two main and slave not-producible moving image files along the time axis.

This configuration converts the decrypted moving image (moving image distributed to the user) to the MPEG format for replaying. With this embodiment, the moving image is compressed to the most basic MPEG-1 format among the MPEG formats, but the format may be MPEG-2 or MPEG-7, and any of the basic compression style in MPEG format enables the compression processing and dividing processing in parallel.

The main moving image file storing unit 223 stores a lot of main moving image files divided by the moving image dividing unit 222 described above, and has a recording space sufficient for storing the lot of main moving image files. The main moving image files stored in the main moving image file storing unit 223 are stored with each file name provided, and stored in the main moving image file storing unit 223 in the layered state according to the content of the moving image and the like.

The moving image file information storing unit 224 stores a lot of various moving image information including the title, the performance time, and the age limit of the original moving image, and has a sufficient recording space.

The main moving image file storing unit 225 stores the dividing information of the main moving image file, a file name of the opponent slave moving image file, and also decoding information required for decoding each of the moving image files, and has a sufficient recording space.

The moving image file information stored in the moving image file information storing unit 224 and the main moving image file information stored in the main moving image file information storing unit 225 are mutually linked to the file name to be stored in, and various moving image information such as the title, the performance time, and the age limit of the original moving image in which the main moving image originates can be fetched according to the request from the terminal.

The content information searching unit 226 is an executing unit executing the search for the original moving image, search for file information, and each of the divided main and slave moving image files, and searches each of the moving image information stored in the moving image file information storing unit 224 and the information (specifically the decoding information) stored in the main moving image file information storing unit 225 to deliver the same to the moving image distributing engine 230 and the CM distributing engine 240 in response to a demand from the moving image distributing engine 230 as well as from the CM moving image distributing engine 240.

The dividing log managing unit 227 is a storing unit storing a history (log) file describing detail of use (for instance, dividing condition and user name of the divider) and the access log when the moving image dividing system according to the present invention is used, and the internal is configured in a layered state. The dividing log managing unit 227 is used to manage the moving image file and user information stored in each file in collaboration with the user certifying engine 210 described above.

Next, the moving image distributing engine 230 includes an slave moving image file storing unit 231 storing the slave moving image file (small file) smaller of the two moving image files divided by the moving image dividing engine 220 described above, an slave moving image file information storing unit 233 storing the file information of the slave moving image file, an slave moving image file information searching unit 234 searching the slave moving image file stored in the slave moving image file storing unit 231 and the file information thereof according to a request from a user terminal and the like, a CM information searching unit 235 searching the file information of the CM moving image file required for distribution of the slave moving image file, an encryption processing unit 236 encrypting the slave moving image based on the data of the CM moving image in response to a distribution request, and a distribution log managing unit 237 managing the distribution log and access log of the moving image distributing engine 230.

The slave moving image file storing unit 231 stores a lot of slave moving images divided by the moving image dividing unit 222, and has recording space sufficient for storing the lot of slave moving images therein.

Each of the slave moving image files stored in the slave moving image file storing unit 231 is provided with a file name and the like, and stored in the slave moving image file storing unit 231 in a layered state according to the content of the moving image and the like. The slave moving image file storing unit 231 is connected with the moving image dividing engine 220 and the CM distributing engine 240 via the information transmission path.

The slave moving image file information storing unit 232 is connected with the moving image dividing engine 220 via the information transmission path, stores the dividing information of the slave moving image file produced by the moving image dividing engine 220, a file name of the opponent main moving image file, and also decoding information required for decoding each of the moving image files, and has a sufficient recording space.

The file information searching unit 233 is a searching unit searching an slave moving image file in response to a distribution request from the certifying engine 210 and the like in collaboration with the slave moving image file storing unit 231 or the slave moving image file information storing unit 232, and has a recording space and memory sufficient for the search.

The CM information searching unit 234 is a searching unit for searching a CM moving image (or CM image) distributed with the slave moving image file in the CM distributing engine 240 and taking the same into the moving image distributing engine 230 in the case of receiving the distributed slave moving image file, and has a recording space and memory sufficient for the search.

The user information searching unit 235 is a searching unit searching a CM distributing information to call the user information of the receiver stored in the certifying engine 210 upon receipt of a request for distribution of the moving image and to distribute the CM moving image optimal for the user based on the user information, and has a recording space and memory sufficient for the search.

The encryption processing unit 236 is a computing unit receiving the CM moving image (or image) from the CM distributing engine 240 upon receipt of a request for distribution from the user terminal and the like and encrypting the slave moving image file of the distribution requestor based on the data of the CM moving image, and has a recording space and memory sufficient for encrypting.

The distribution log managing unit 237 is a storing unit storing a history (log) file describing detail of use (for instance, distribution condition and distributed slave moving image file and CM file) and the access log when the moving image dividing system according to the present invention is used, and the internal is configured in a layered state. The distribution log managing unit 237 is used to manage the moving image and user information stored in each file in collaboration with the user certifying engine 210 described above.

The CM distributing engine 240 includes a CM moving image storing unit 241 storing the CM moving image distributed by the sponsor, a CM image storing unit 242 storing the CM image similarly distributed by the sponsor, and a CM information storing unit 243 storing the content, the time, the requested condition of distribution, the copyright information and the like of the CM moving image and the CM image.

The CM moving image storing unit 241 has a recording space sufficient for storing a lot of CM moving images distributed from a plurality of sponsor and is layered internally with respect to each sponsor, each layer of which is further layered with respect to each CM content. With the embodiment, the CM moving image is stored in MPEG format like the moving image file, but may be in other moving image format.

The CM image storing unit 242 also has a recording space sufficient for storing a lot of CM images distributed from a plurality of sponsor and is layered internally with respect to each sponsor, each layer of which is further layered with respect to each CM content.

With the embodiment, the CM image is stored in JPEG (Joint Photographic Experts Group) format or BMP (Bitmap) format with a prespecified size, but may be in other image format.

The CM distributing engine 240 is provided with a CM managing engine 250 managing the distribution information of the CM file. The CM managing engine 250 includes a counting unit 251 counting the number of distribution of either one or both of the main and slave moving image files, a CM distribution managing unit 252 managing the distribution log of the CM file distributed with the moving image file, and a CM information creating unit 253 computing the distribution information of the CM file according to the number of CM distribution and the distribution log.

The counting unit 251 is internally layered with respect to each moving image file and CM file to count the number of distribution of each moving image file distributed in response to the moving image distribution request received by the moving image distributing engine 230 and the CM file attached to the moving image file separately and store each of the counted numbers separately. For the count of the moving image file, either one or both of the main and slave moving image files are subjected to counting.

The CM distribution managing unit 252 is a managing system managing the file information and the counted number of the CM file attached to the moving image file distributed to the user terminal 5, internally layered with respect to each CM file, and responsible for management of the distribution log of the CM file.

The CM information creating unit 253 is a CM managing system computing the distribution state of the CM file, the distribution count, the advertising cost and the like with reference to the distribution log of the CM file and the sponsor information file 213 of the CM file in collaboration with the counting unit 251 and the CM distribution managing unit 252 described above, and distributing various information to the service provider server 2 and the sponsor server 3.

According to the CM managing engine 250, upon receipt of the distribution request from the user terminal, the distribution count of the image content is counted by the counting unit 251 at the same time as the distribution, and the CM information creating unit 253 further creates CM distribution information based on the counted number and the distribution log of the attached CM file, and reports the distribution state to the moving image contents provider server 2 and/or the sponsor server 3. The distribution information herein includes not only the number of CM distribution and the receiver of distribution but also the CM advertising cost accompanying the CM distribution and the like.

As a distribution method, a report is available per constant number of counts, or the number of the distribution count may be reported at regular periods. It is also possible at the same time to compute and notify the advertising income and the distribution charge involved in the CM distribution.

With the embodiment, while the service provider server 2 includes the user certifying engine 210, the moving image dividing engine 220, the moving image distributing engine 230, and the CM distributing engine 240, these engines are the minimum configuration required to establish the moving image distribution system according to the present invention, a replaying means distributing engine for distributing a replaying software (replaying means) to replay the moving image with the present invention to the user terminal may be further provided, and any other additional equipment can be selected optionally as long as the configuration described above is fulfilled.

Figure 3:
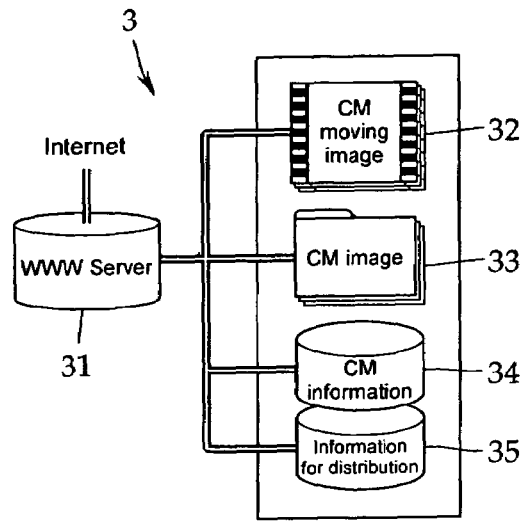
FIG. 3 is a system block diagram showing a sponsor server with the moving image distribution system described above.

Next, with reference to FIG. 3, a configuration of the sponsor server 3 is explained. The sponsor server 3 includes the WWW server 21 connected with the internet line 1, a CM moving image storing unit 32 storing the original moving image of the CM moving image, a CM image storing unit 33 storing the original image of the CM image, a CM information storing unit 34 storing moving image information (image information) of the CM moving image or CM image, and a distribution information managing unit 35 managing the distribution log of the CM moving image or CM image from the sponsor server 3.

With the embodiment, the CM moving image storing unit 32, the CM image storing unit 33, the CM information storing unit 34, and the distribution information managing unit 35 are actually stored in the WWW server 31 and mutually connected via the information transmission path enabling to transmit and receive information each unit possesses.

The CM moving image storing unit 32 has a sufficient recording space so as to store a lot of original CM moving images created by the sponsor and is internally layered with respect to each CM moving image content. With the embodiment, the CM moving image file is stored in MPEG format like the moving image file in the CM moving image storing unit 32, but may be in other moving image format.

The CM image storing unit 33 also has a sufficient recording space so as to store a lot of original CM images created by the sponsor and is internally layered with respect to each CM moving image content. With the embodiment, the CM image is stored in, for instance, JPEG format or BMP format with a prespecified size, but may be in other image format.

While the WWW server 31 distributes the CM moving image and the CM image to the service provider server 2 via the network line 1 with the embodiment, an external output device such as a CD-ROM may be further provided to copy the CM moving image and the CM image on a physical medium for distribution.

The CM information storing unit 34 has a sufficient recording space so as to store a lot of file information of CM moving images and CM images and moving image information, and each piece of information is layered like the CM moving image storing unit 32 and the CM image storing unit 33. The CM information storing unit 34 is transmitted to the receiving terminal along with the CM moving image (CM image) in response to the distribution request of the CM moving image (or image).

The distribution information managing unit 35 is a managing unit managing the CM distribution log from the sponsor server 3, detail of use of the CM (for instance, the distribution count of the CM, the distribution condition, and the advertising cost) transmitted from the service provider server 2 and the like, and is internally configured in the layered state with respect to each CM file. The distribution information managing unit 35 is used to grasp the state of CM distribution in collaboration with the service provider server 2.

While the sponsor server 3 includes the CM moving image storing unit 32, the CM image storing unit 33, the CM information storing unit 34, and the distribution information managing unit 35 in the WWW server 21 with the embodiment, these units are the minimum configuration required to establish the moving image distribution system according to the present invention, and a CM creating engine creating CM moving images and CM images and the like may be additionally provided for integration. The units may also be provided outside of the WWW server 21.

Figure 4:
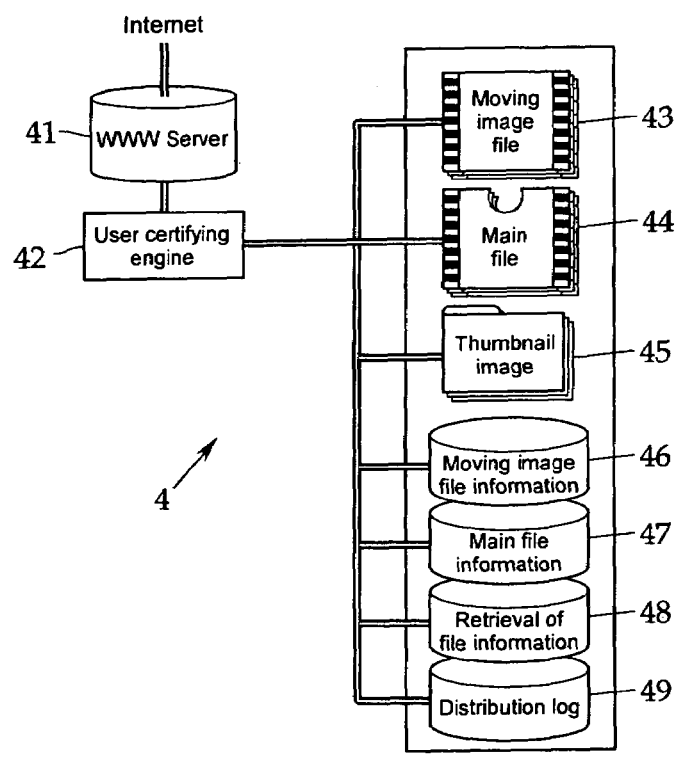
FIG. 4 is a system block diagram showing a moving image contents provider server with the moving image distribution system described above.

Specific configuration of the contents provider server 4 is described below with reference to FIG. 4. The contents provider server 4 comprises the WWW server 41 for accepting a demand for connection to the WWW server 41 connected to an Internet line 1, a user certifying engine 42 for executing certification in response to the demand for connection to the contents provider server 4, a moving image file storing section 43 for storing original contents of an moving image, a main moving image file storing section 44 for storing therein a main file which is one of the two moving image files obtained by dividing a moving image in the service provider server 2, a thumbnail moving image file storing section for storing therein a thumbnail moving image (or a thumbnail image) preparing by extracting a beginning portion of a moving image file which can be distributed to a user terminal, a moving image file information storing section 46 for storing therein moving image information such as a title or a time length of the original moving image, a main moving image file information storing section 47 for storing therein, in addition to file information for the main moving file, file information for a slave moving image file at a partner, a file information retrieving section 48 for receiving a demand for distribution of an moving image file, retrieving the demanded moving image file and the file information from the main moving image file storing section 44 and from the main moving image file information storing section 47 and distributing the moving image file to a demander, and a distribution log managing section 49 for managing log data for distribution of the main moving image file, and these system components are connected to each other through a communication delivery path.

Each of the WWW server 41, user certifying engine 42, moving image file storing section 43, a moving image file 44, a moving image file information storing section 46, and main moving image file information storing section 47 may has the basically same configuration as that of the service provider server 2 described above, and therefore description thereof is omitted herefrom.

The thumbnail moving image storing section 45 has a recording area sufficient for storing therein a number of thumbnail moving images (or thumbnail images), and distributes each thumbnail image or an image to a user terminal in response to a user's demand for distribution. In this embodiment, a thumbnail moving image (image) is stored with the MPEG format or JPEG format, and is distributed with the HTML format enabling display at the user terminal.

The file information retrieving section 48 is a retrieving section for receiving a demand for distribution of a moving image and retrieving a main moving image file at the demander and the file information, and also functions as a distributing section for distributing the retrieved moving image file and the file information to the demander, and therefore has a storage area sufficient for retrieval and distribution. This file information retrieving section 48 distributes log data for distribution to the distribution log managing section 49.

The distribution log managing section 49 is a managing section for managing log data for distribution to user terminals or contents (such as a file name and the dividing state) of a main moving image file distributed from the service provider server 2, and the internal structure is divided to multiple layers each for a file. This distribution information managing section 35 is used together with the user certifying engine 42 for grasping a situation of distribution of a moving image file.

In this embodiment, the user certifying engine 42, moving image file storing section 43, main moving image file storing section 44, thumbnail moving image storing section 45, moving image file information storing section 46, main moving image file information storing section 47, file information retrieving section 48, and distribution log managing section 49 are minimum components required for construction of the moving image distribution system according to the present invention, and additional components may be added thereto.

In this embodiment, all of the system components are provided in the WWW server 41, but can be provided outside the WWW server 41.

Figure 5:
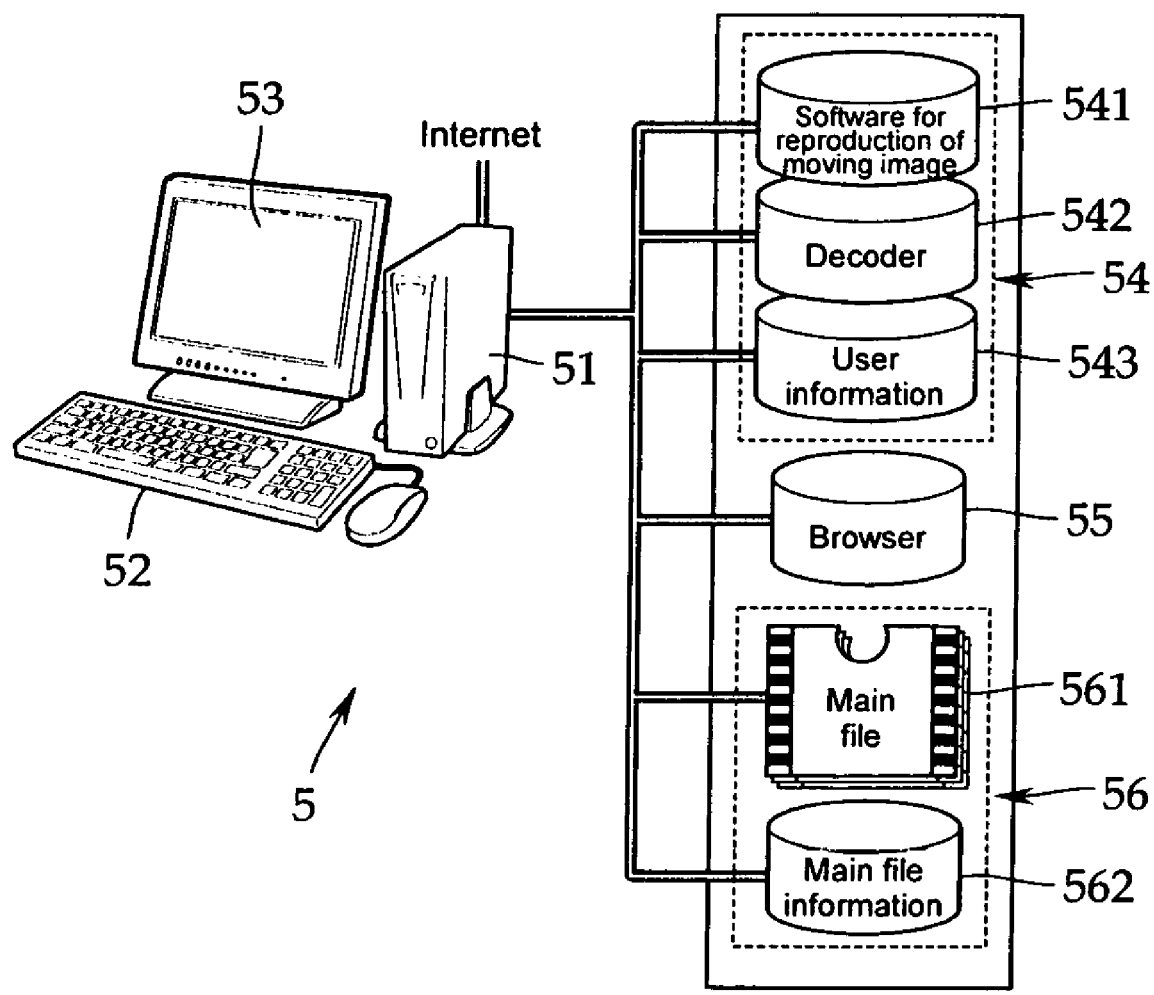
FIG. 5 is a system block diagram showing a user terminal with the moving image distribution system described above.

Configuration of the user terminal 5 is described below with reference to FIG. 5. The user terminal 5 is a so-called personal computer having a terminal body 51 including a hard disk 52 as a memory section therein, a keyboard 52 as an input section for inputting an input signal to the terminal body 51, and a monitor 53 as an output section for displaying an output signal from the terminal body 51.

A computing section for computing an input signal according to a prespecified processing procedure and a control section for controlling the system as a whole (both components not shown) are provided in the terminal body 51.

Provided in the hard disk 52 of the terminal body 52 are moving image file reproducing software 54 for decoding the main and slave moving image files distributed thereto together with a CM moving image file, a browser 55 for displaying a file with, for instance, the HTML format distributed through the Internet line 1 on the monitor 53, and a moving image file storing section 56 for storing therein a main moving image file 561 provided by the service provider server 2 and the file information 562.

An operating system (OS) for controlling the user terminal 5 itself, each software and the system is installed in the hard disk 53 provided in the terminal body 51. There is no specific restriction over a type of the operating system, and the type can optionally be changed according to specifications of the system.

The reproduction software 54 comprises a moving image reproducing section 541 for reproducing and displaying each decoded moving image file (including CM moving images) on the monitor 53, a decoder 542 for receiving a demand for reproduction of a main moving image file, receiving the slave moving image file matching the demanded main moving image file distributed from the service provider server 2 together with the CM moving image and decoding the moving image file to a reproducible moving image file, and a user information storing section 543 for storing therein various personal information concerning the user.

The moving image reproducing section 541 is a computing section for computing an input moving image file according to a prespecified processing procedure, and has a storage area and a memory sufficient for computing. The input moving image file to the moving image reproducing section 541 is subjected to a prespecified computing process and converted to a video signal, and is displayed via an output section (not shown) in the terminal body 51 on the monitor 53.

The decoder 542 is a computing section for decoding (decrypting a main moving image file and a slave moving image file based on prespecified information for decoding, and has a storage area and a memory sufficient for the computing processing. The decoder 542 recognizes reproduction of a CM moving image in cooperation with the moving image reproducing section 541, extracts information for decoding stored in the CM moving image, and reproduces the main moving image file and the salve moving image file to the original reproducible moving image based on the information for decoding.

The decoder 542 decodes a main moving image file and a slave moving image file, and also executing processing for combining the slave moving image file encrypted with the CM moving image with the main moving image file. Namely the decoder 542 receives a CM moving image and a slave moving image file, and subjects the CM moving image and the slave moving image file to exclusive logical sum (XOR) processing to reproduce the data to the ordinary CM moving image and slave moving image file. By decoding the slave moving image file combined with the CM moving image together with the main moving image file, the original moving image can be reproduced.

The user information storing section 543 stores therein various information concerning the user such as a mail address, an age, and a name, and also stores therein information such as types of CM moving images which the user hopes distribution thereof in the initial registration.

Because of the feature of this system described above, as personal information is stored in the user terminal 5, management of the personal information can be performed at the user terminal 5, and the personal information is distributed to a target server in response to a demand, so that leakage of the personal information to a third party can be prevented.

The browser 55 is browsing software required for displaying a homepage of a partner to which the user terminal 5 is connected via the Internet terminal 1, and decodes display data with the HTLM format transmitted from the connected terminal and displaying the same on the monitor 53 of the user terminal 5.

The moving image file storing section section 56 comprises a main moving image file storing section 561 for storing therein a main moving image file and a main moving image file information storing section 562 for storing therein file information including, for instance, attribute information of the main moving image file.

The main moving image file storing section 561 has a storage area sufficient for storing a number of main moving image files, and the moving image files are stored therein hierarchically. Also the main moving image file information storing section 562 has a storage area sufficient for storing therein a number of main moving image information, and the information is stored therein hierarchically.

In this embodiment, the moving image file storing section 56 is provided in a hard disk area of the user terminal 5, but may be distributed in the state where the moving image file storing section 56 is stored in a physical medium such as a CD-ROM or a DVD-ROM, and there is no specific restriction over the form so long as the moving image file storing section 56 can store therein a main moving image file and file information thereof.

The present invention also includes a moving image dividing system for dividing a moving image file and a program for the moving image dividing system. This moving image dividing system (program) is stored in a moving image dividing section 222 stored in the moving image distributing engine 221 of the service provider server 2.

A basic component of the moving image dividing unit 222 is an engine for compressing an input moving image to that with the MPEG format, and by incorporating a dividing system according to the present invention in the moving image compressing engine, it is possible to compress and at the same time divide a moving image to two not-reproducible moving image files, namely a main one and a slave one.

The moving image dividing unit 222 has a frame dividing unit (frame dividing step of) for acquiring a moving image by frame and dividing each frame for a first frame including only the frame information and a second frame including the frame information and frame information for a preceding frame, a bit dividing unit (bit dividing step of) for dividing a fist frame to lower 7 bits and a top bit, a code dividing unit (code dividing step of) for dividing a second frame to a first code including only the second frame information and a second code including the second frame information and frame information for a preceding frame, a coefficient extracting section (coefficient extracting step of) for subjecting the first code to discrete cosine transform to extract an AC coefficient and a DC coefficient thereof respectively, and a moving image file constructing unit (moving image file constructing step of) for combining, the second code, the AC coefficient, and lower 7 bits of the first frame to construct a main moving image file and also for combining the DC coefficient and the top bit of the first frame to construct a slave moving image file.

Figure 6:
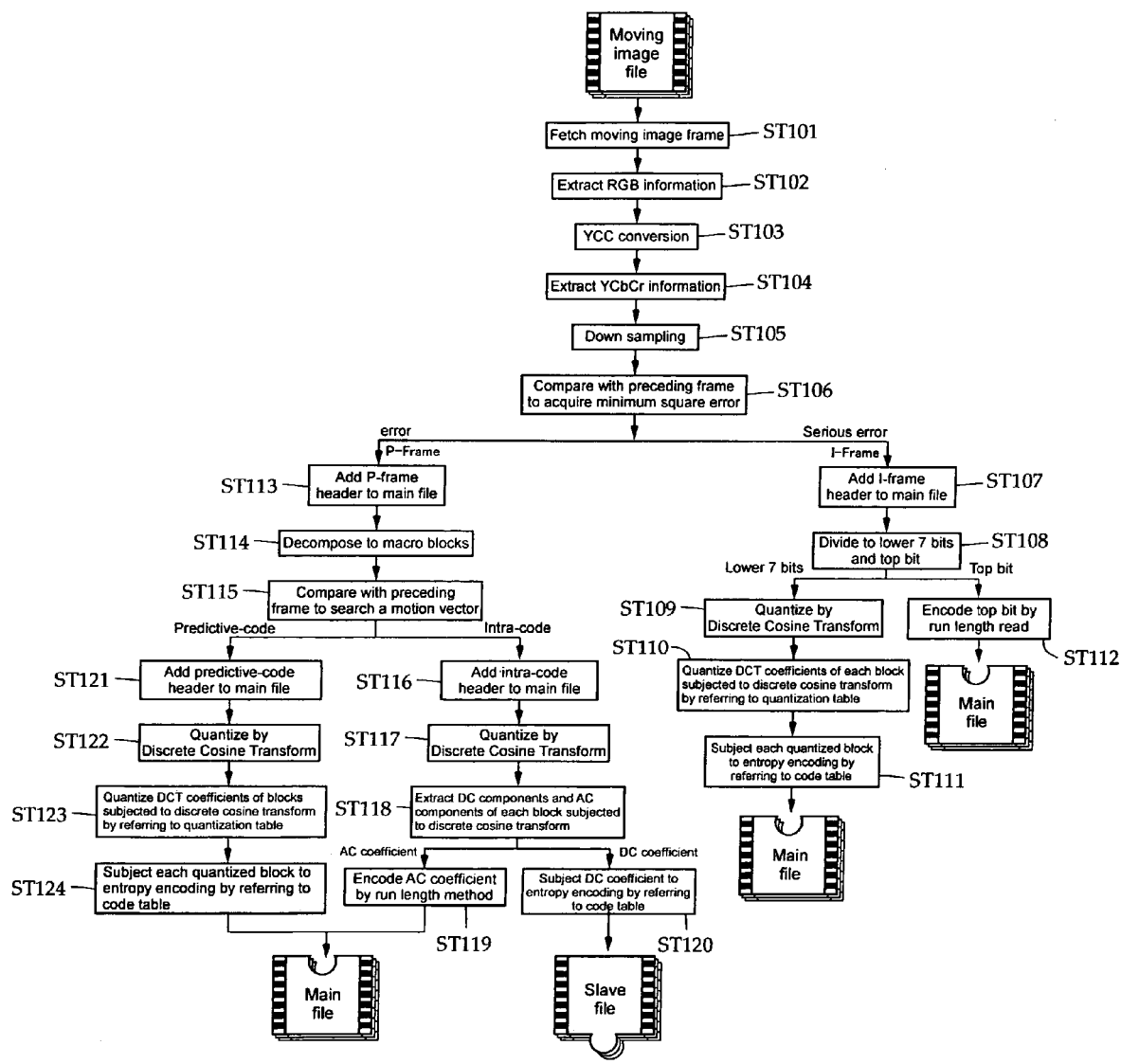
FIG. 6 is a flow chart indicating a flow of dividing the moving image in the moving image dividing system according to an embodiment of the present invention.

This moving image dividing system is executed by performing a prespecified computing step. FIG. 6 illustrates an example of the computing step. At first, when a moving image dividing engine 220 receives a demand for diving a moving image, the moving image dividing engine 220 acquires a specified moving image file from the moving image file storing section 221 provided therein, and fetches frames for the moving image (step ST101).

Then the moving image dividing engine 220 extracts RGB information of the fetched frames (step ST102) and replaces the frames as RGB data with brightness information (Y) based on the G component, color difference information (C) for the R component and Y component (step ST103).

Then the moving image dividing engine 220 extracts brightness information Y, color difference information Cb of the C component, and color difference information Cr for the R component from the YCC-converted frame above (step ST104), compresses the extracted information for colors not visually recognized one some level, and down-samples the data volume to about a quarter of that of the original information (step ST105).

Furthermore the frame down-sampled in step ST105 is compared to a preceding frame along the time axis to acquire the minimum square error (step ST106) and divides the frame to an I-frame (first frame) including only information within the frame and a P-frame (second frame) including information acquired based with the minimum square error from the preceding frame. Also when a B-frame for frame information concerning preceding and following frames, the same dividing processing can be performed like in the case of the P-frame.

A frame fetched first (header frame) does not have information concerning a preceding frame, the frame is always the I-frame. In this embodiment, each of the I-frame and P-frame is 8-bit array data.

Of the divided frames, the I-frame header is at first added to the main moving image file (step ST107), and the frame information is divided to lower 7 bits and a top bit (step ST108).

The lower 7 bits obtained after division in step ST108 are quantized (step ST109) by means of discrete cosine transform (DCT), a DCT coefficient for each block is furthermore quantized with a quantification table (step ST110), and each of the quantized blocks is subjected to entropy encoding based on a code table (step ST111). With the operation described above, the encoded data is incorporated in the main moving image file as a portion thereof.

The other top bit is subjected to reversible compression line by line. At first, the first line is compressed and encoded by the run length method, and the second line and on are compressed and encoded by means of READ to form a portion of the slave moving image file (step ST112).

Of the divided frames, at first an I-Frame header for the P-frame is added to the main moving image file (step ST113).

Then the P-frame is decomposed to macro blocks (step ST114), and the macro block is compared with a macro block just ahead along the time axis to check a motion vector (a change rate in motion between frames) (step ST115), and is divided to an I (Intra)-code (first code) including only the in-frame information and a P (Predicative)-code (second code) including the information acquired based on the motion vector with the preceding frame.

Of the code obtained by division in step ST115, a header of the I-code is added to the main moving image file (step ST116) and is quantized by means of discrete cosine transform block by block (step ST117) to extract an AC coefficient and a DC coefficient of each block (step ST118).

The AC coefficient is once replaced with a matrix intermediate sign and is furthermore encoded by means of the run length method (step ST119). The encoded data is incorporated in the main moving image file as a portion thereof. The DC coefficient is subjected to entropy encoding based on a code table (step ST120), and the encoded data is incorporated in the slave moving image file.

Of the codes obtained by division in step ST115, header information of the P-code is added to the main moving image file (step ST121) and is quantized by discrete cosine transform block by block (step ST122), and furthermore the quantized DCT coefficient is quantized block by block according to a quatization table (step ST123). Finally each of the quantized blocks is subjected to entropy encoding according to the code table and is incorporated in the main moving image file (step ST124).

In the dividing method described above, a moving image frame is compressed and then divided, but also the following method may be employed for dividing a moving image already compressed. In this method, the moving image dividing unit 222 comprises a frame dividing unit (frame dividing step) for acquiring a moving image frame by frame and dividing each frame to a first frame including only the frame information and a second frame including the frame information and frame information concerning a head just ahead, an first block extracting unit (first block extracting step) of extracting a block from the first frame, a first coefficient extracting section (first coefficient extracting step) for acquiring a DC coefficient and an AC coefficient from the block extracted by the first block extracting unit, a second block extracting unit (second block extracting step) for extracting a block frame the second frame, a second coefficient extracting section (second coefficient extracting step) of acquiring a DC coefficient and an AC coefficient from the block extracted by the second block extracting unit, a filtering section (filtering step) of subjecting the DC coefficient for a preceding frame the frame acquired by each coefficient extracting section to the exclusive logical sum (XOR) processing to take out a portion of the bits as a filter factor, a first file constructing section (first file constructing step) of subjecting the AC coefficient extracted by the first coefficient extracting section and the filter factor produced in the filtering section to the exclusive logical sum (XOR) processing, and a second file constructing section (Second file constructing step) of subjecting the AC coefficient extracted by the second coefficient extracting section and the filter factor produced in the filtering section to the exclusive logical sum (XOR) processing.

Also in this example, the moving image dividing system is executed by performing a prespecified processing procedure. An example of the processing procedure is shown in the figure. At first, when the moving image dividing engine 220 receives a demand for division of a moving image, the moving image dividing engine 220 access to a specified moving image file in the moving image file storing section 221 and acquires frames of the moving image (step ST401).

Then the sample sampled in step ST401 is divided to a I-frame including only the in-frame information (first frame) and a P-frame (second frame) including information acquired by means of minimum square error with a preceding frame.

Also a B-frame including information concerning preceding and following frames can be subjected to division like the P-frame.

Of the frames obtained by division, at first, blocks constituting a frame are extracted by the first frame extracting unit (step ST402). Then a DC coefficient is acquired from the block extracted in step ST402, and is incorporated in a slave moving image file (step ST403).

The remaining AC coefficient is subjected together with the filter factor produced in the filtering section to the exclusive logical sum (XOR) processing, and is incorporated in the main moving image file (step ST404). Other block elements such as a scale factor other than the DC coefficient and AC coefficient are stored together with the AC coefficient in the main moving image file.

When there are remaining blocks acquired from the I-frame, the moving image dividing unit 222 again repeats the process sequence from step ST402, and executes the dividing process to all blocks in the frame (step ST405).

Blocks constituting the P-frame are extracted by the second frame extracting unit (step ST406). When the extracted blocks are intra-code blocks, the processing flows to the next step. When the blocks are inter-code blocks, the subsequent steps are skipped, and the process sequence is repeated until the intra-code block appears (step ST407).

The process sequence is employed because the inter-code block is produced by referring to the intra-code block. Dividing the intra-code block and then dividing inter-code block is troublesome, which may leads to lowering of the processing speed.

Then a DC coefficient is acquired form the intra-code block extracted in step ST407, and is stored as a portion of the slave moving image (step ST408).

The AC coefficient is subjected together with the filter factor produced in the filtering section to the exclusive logical sum (XOR) processing, and is then stored as a portion of the main moving image file (step ST409). Block elements other than the DC coefficient and AL coefficient such as the scale factor are stored together with the AC coefficient in the main moving image file.

When there are still remaining blocks taken out from the P-frame, the process sequence is repeated from step ST408 again, and the dividing processing is executed to all blocks in the frame (step ST410).

When all blocks in the P-frame and I-frame have been processed, the moving image dividing unit 222 reads out all DC coefficients in all of the processed blocks, subjects the blocks to the exclusive logical sum (XOR) to extract lower 8 bits of each block, and the lower 8 bits of each block is used as a filter factor in dividing the next frame (step ST411). When processing a first frame, there is no preceding frame, so that the filter factor is set to 0 (zero).

All of the DC coefficients are processed in step ST411 because values of the DC coefficients are similar to each other and there is little load to the processing speed. Moreover, all of the DC coefficients are subjected to the exclusive logical sum (XOR) processing to clarify differences between filter factors between frames having similar values respectively.

After the filter factors are computed, when it is determined that there is a next frame, the moving image dividing unit 222 acquires the frame in step ST401 again, and executes the dividing processing based on the filter factor computed for the preceding frame, and the process sequence is finished when all of the frames have been processed (step ST412).

With the functional configuration described above, a moving image having been subjected to the processing for compression can be subjected to the processing for division, and therefore the processing speed can be improved further as compared with the case in which the processing for compression and processing for division are executed concurrently. Furthermore, by leaving the inter-code blocks unprocessed to simplify the processing procedure, the processing speed can be improved more.

Figure 7:
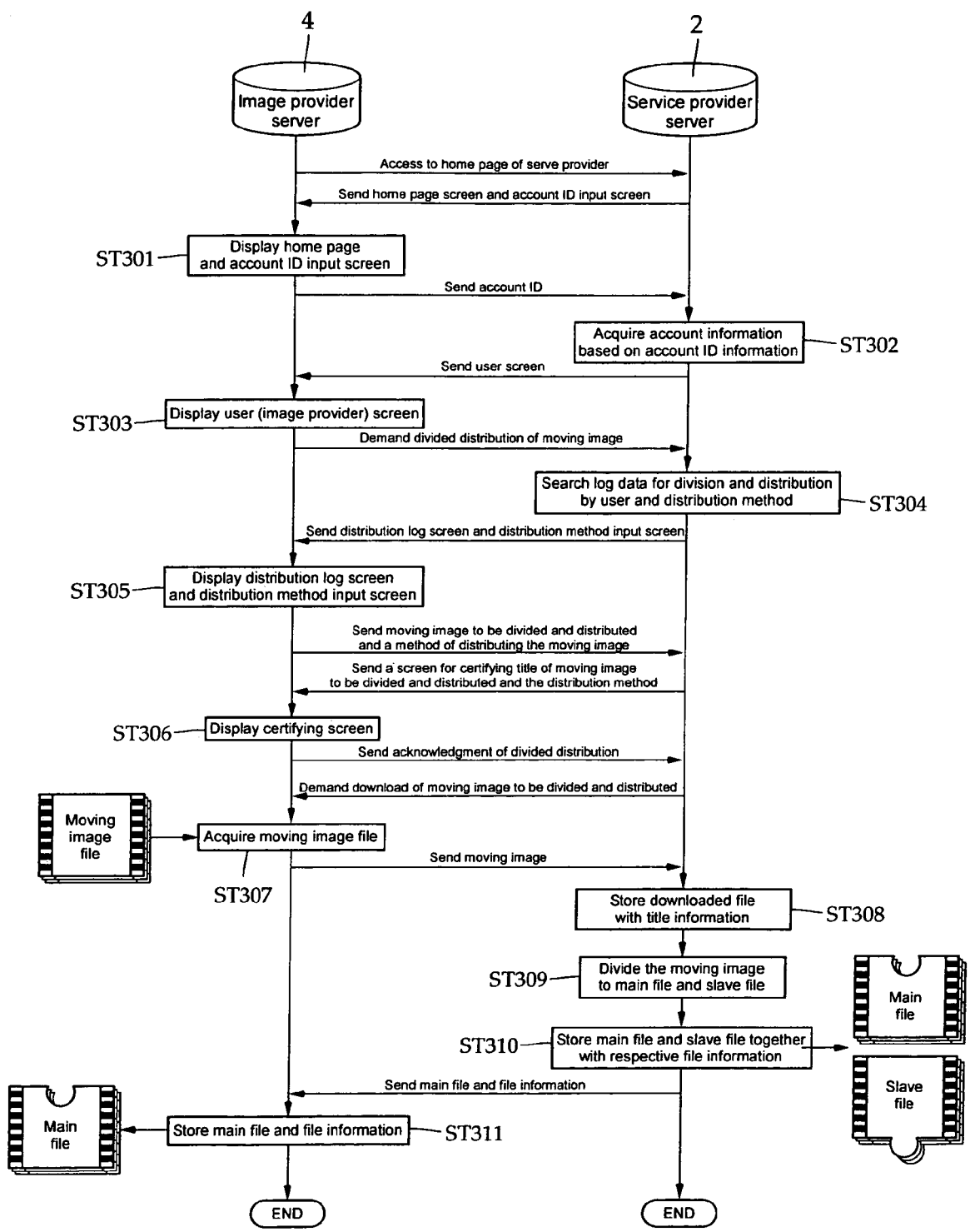
FIG. 7 is a flow chart indicating an example of the moving image distribution procedure in the service provider server and the moving image contents provider server with the moving image distribution system described above.

The processing process for dividing a moving image executed by the service provider server 2 and the moving image contents provider server 4 in the moving image distribution system according to the present invention are described with reference to a flow chart shown in FIG. 7.

At first, a moving image contents provider starts up a browser and access a web site of a service provider, for instance, by inputting an address of the web site. Then the WWW server 21 transmits information required to display the web site, images, and an input screen for the account information with the HTML format, and the web site and the screen for inputting an account ID and a password are displayed on a display (display unit) at the moving image contents provider having received the data (step ST301).

When the moving image provider inputs a prescribed account ID and a password on the input screen and issues a request for transmission, the input account ID and password are notified to the user certifying engine 210 at the service provider server, and the user certifying engine 210 executes the certifying processing (step ST302).

In the following description, a case is assumed in which the account information is certified by the user certifying engine 210 as that of the service provider. When the service provider is a new user having no prescribed account information as a moving image contents provider, registration of the user is executed by the new user registering section 216. When it is determined that the input account information is erroneous, a certification error screen is sent to the moving image contents provider.

When certified by the user certifying engine 210, the moving image contents provider sends a user screen with various types of user information such as access log or moving images already divided is sent to the moving image contents provider (step ST303).

When the user screen is displayed, the moving image contents provider demands divided distribution of the moving image. When the service provider server 2 receives divided distribution of the moving image, the service provider server 2 searches log data for divided distribution of the moving image in the past or the distributing method (step ST304), and sends a distribution condition input screen with various distribution conditions such as distribution log or distributing method is sent to the moving image contents provider.

The moving image contents provider displays the distribution condition input screen (step ST305), specifies a title of a moving image to be distributed next or the distributing method, and sends the data to the service provider server 2. Then the service provider server 2 again certifies the distributed contents, and sends a screen with a text acknowledging the distributed contents displayed thereon to the moving image contents provider.

The conditions for distribution as used herein include a method of managing a main moving image file and a slave moving image file after division, namely whether the main moving image file is to be managed by the moving image contents provider both of the main and slave moving image files are to be managed by the service provider, and a type of a CM moving image appended to the slave moving image file, or how to receive a copyright fee.

When the moving image contents provider receives the information above, the moving image contents provider has a screen for reaffirmation displayed (step ST306). When a divided distributed acknowledgement button displayed on the screen is clicked, an acknowledgement signal is transmitted to the service provider server 2, and the service provider server 2 demands downloading of the moving image file to be divided and distributed.

The moving image contents provider server 4 having received the demand for downloading searches the moving image file storing section 43 and the moving image file information storing section 44 in the WWW server 41 to acquire the required moving image file (step ST307), and sends the moving image file together with the moving image file information to the service provider server 2. At the same time, the moving image contents provider server 4 stores the distribution log in the distribution log managing section 49.

In this embodiment, the moving image contents provider distributes a moving image file to be divided and distributed to the service provider server 2 via the Internet line 1 in the online mode, but the contents may be provided via a physical medium such as a CD-ROM.

The service provider server 2 having received the moving image at first sets titles for the moving image file and file information respectively and stores the titles in the moving image file storing section 221 and the moving image file information storing section 222 in the moving image file dividing engine 220 in the inter-linked state respectively (step ST308).

Then the service provider server 2 distributes the moving image to the moving image dividing engine 220. The moving image dividing engine 220 having received the moving image divides the moving image to two not-reproducible moving image files, namely a main one and a slave in the moving image dividing section 222 incorporated therein according to the processing procedure shown in FIG. 6 (step ST309).

Respective file information is added anew to each of the main moving image file and slave moving image file obtained by division of the moving image, and the main moving image file is stored in the main moving image file storing section 223 of the moving image dividing engine, while the slave moving image file is stored in the slave moving image file storing section 231 of the moving image distributing engine 230 respectively (step ST310). At the same time, also the file information is sent to and stored in the main moving image file information storing section 224 and the slave moving image file information storing section 232 (step ST311).

The moving image dividing engine 220 sends the produced main moving image file with the main moving image file information appended thereto to the moving image contents provider. Finally the moving image dividing engine 220 sends the division log for the moving image to the division log managing section 228 for management of the division log. With the operation described above, a sequence of steps of dividing the moving image is completed.

In this embodiment, the produced main moving image file is distributed to a moving image contents provider in the online mode via the Internet line 1, but, for instance, an electronic mail may be appended for improving the security, or may be distributed with a physical medium such as a DVD-ROM in the off line mode.

Figure 8:
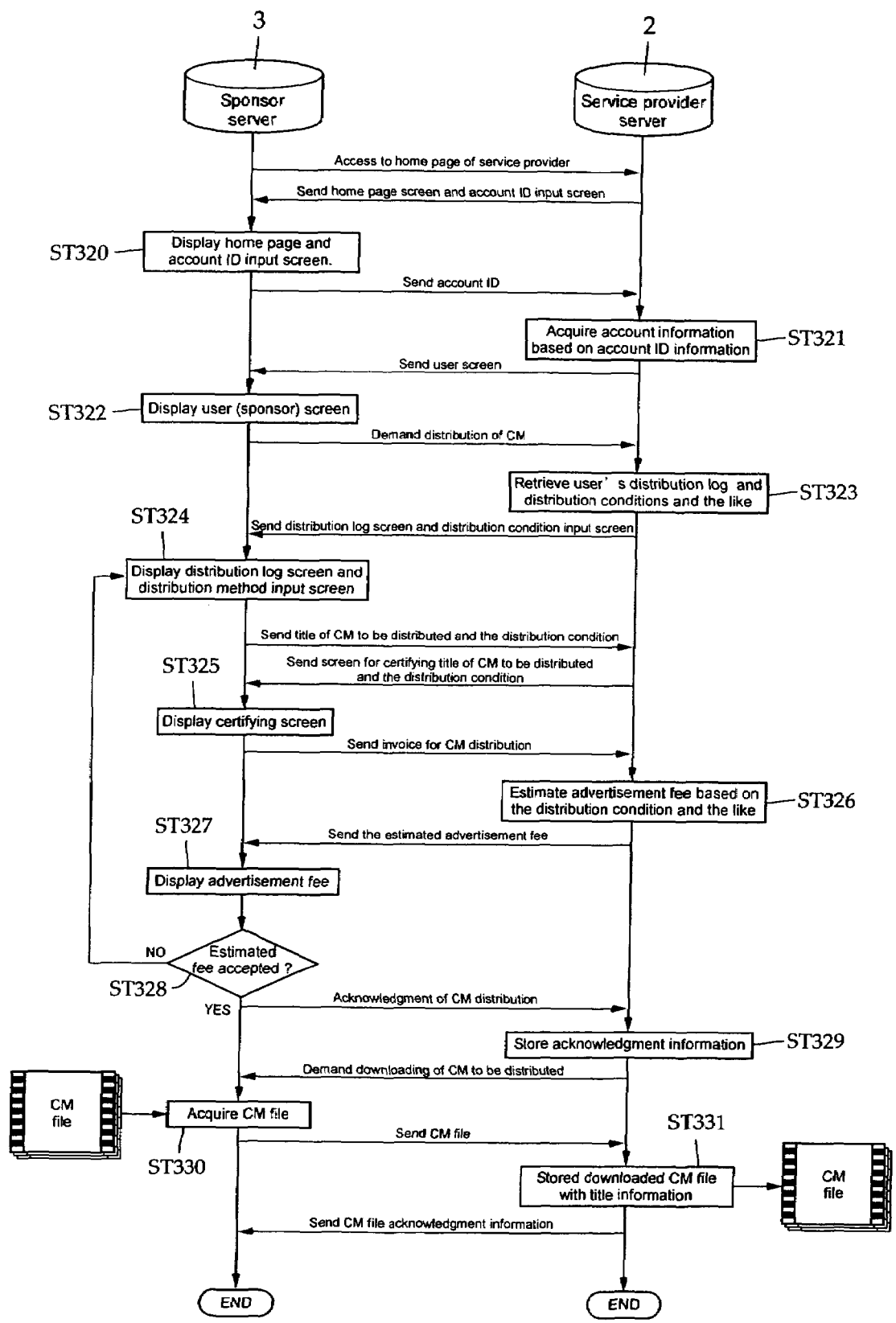
FIG. 8 is a flow chart indicating an example of the moving image distribution procedure in the service provider server and the sponsor server with the moving image distribution system described above.

Next an example of a processing procedure for distribution of CM executed between the service provider server 2 and the sponsor server 3 in the moving image distribution system according to the present invention is described below with reference to a flow chart shown in FIG. 8. The process sequence up to the step of providing a user screen is substantially the same as that executed by the moving image contents provider, and therefore the process sequence is described only simply in the following description.

At first, when the sponsor boots a browser and accesses a homepage of the service provider, the WWW server 21 sends the homepage, and the homepage is displayed on a display unit at the sponsor (step ST320).

Then the sponsor inputs an account ID and a password on the input screen and sends the screen, and the user certifying engine 210 having received the screen executes the processing for certification (step ST321). When the sponsor is certified, the service provider server 2 sends a user screen displaying various types of user information such as access log in the past or existing CM information to the sponsor.

When the sponsor issues a demand for distribution of CM on the user screen, the service provider server 2 searches log data for distribution to the user or conditions for distribution (step ST323), and sends a distribution condition input screen displaying the various conditions for distribution as described above to the sponsor.

The distribution condition input screen is displayed at the sponsor terminal (step ST324), and specifies and sends a title of the CM moving image file to be distributed to the service provider server 2 or a method of distributing the file. The service provider server 2 receives the distributed contents. When the contents are desired ones, the service provider server 2 returns a screen displaying a text indicating acknowledgement of the contents to the sponsor. The conditions for distribution of CM includes a types of desired moving image contents, a gender and age of a target for distribution (user) of the CM moving image, and the like.

The sponsor server 3 displays the reaffirmation screen on the monitor (step ST325), reaffirms the distributed contents, and demands estimation of cost for distribution of the CM. The service provider server 2 receives the demand for estimation, executes a prespecified processing step for estimation (step ST326) based on the conditions for distribution and the like, and then sends the estimation screen to the sponsor server 3.

The sponsor server 3 displays the distributed estimation screen (step ST327). When the displayed advertisement fee is acceptable, the sponsor clocks on a distribution acknowledgement button displayed on the screen. Then the acknowledgement signal is sent to the service provider server 2 (step ST328), and the acknowledgement information is stored, for instance, in the sponsor information storing section 213 of the user certifying engine 210 (step ST329).

When it is determined that the demanded advertisement fee is not acceptable, the sponsor server 3 returns to step ST324 and again sets the conditions for distribution of the CM moving image or the distributing method to demand an estimation again.

The service provider server 2 demands downloading of a CM moving image file to be distributed. The sponsor server 3 having received the demand for downloading at first searches the CM moving image file storing section 32 and the CM information storing section 34 in the WWW server 31 to acquire the demanded CM file moving image file (step ST330), and sends the CM moving image file together with the moving image file information to the service provider server 2. The sponsor server 3 stores the distribution log in the distribution log information managing section 35.

In this embodiment, the sponsor distributes a CM moving image file to be distributed to the service provider server 2 via the Internet line 1 in the online mode, but the CM moving image file may be provided via a physical medium such as a DVD-ROM.

The service provider server 2 having received the CM moving image at first sets titles of the CM moving image file and the CM file information as backups and stores the CM moving image file and the CM file information in the CM moving image storing section 241 and the CM moving image information storing section 243 of the CM distributing engine 240 respectively in the inter-linked state (step ST331). Finally the service provider server 2 returns the acknowledgement information to the CM moving image to the sponsor server 3. The acknowledge information may be sent to the homepage or as an electronic mail.

Next an example of a processing procedure for distributing a moving image performed among the service provider server 2, the moving image contents provider 4, and the user terminal 5 in the moving image distribution system according to the present invention is described with reference to a flow-chart shown in FIG. 9.

When the user terminal 5 accesses a homepage of a moving image contents provider, the moving image contents provider server 3 sends a homepage screen from the WWW server 31 incorporated therein so that the homepage screen is displayed on a monitor of the user terminal 5 (step ST340).

The user furthermore checks the screen and demands a screen displaying moving images capable of being distributed. The moving image contents provider server 3 issues an instruction to the file information searching section 48 and searches moving image contents which can be distributed (step ST341), and sends a screen displaying a list of moving images which can be distributed to the user terminal 4 as thumbnail images.

In this step, the moving image contents provider server 3 may drive the user certifying engine 42 to certify the user before sending the screen displaying moving images which can be distributed. The certification can be performed, for instance, as described above.

The user checks the thumbnail screen displayed on the terminal 5, and sends a demand for distribution of a moving image to be browsed to the moving image contents provider server 3 (step ST342). The moving image contents provider server 3 having received the demand for distribution again issues an instruction to the file information searching section 48, retrieves the main moving image file demanded to be distributed and the file information from the main moving image file storing section 44 and the main moving image file information storing section 47 (step ST343), ascertains presence of the main moving image file to be distributed and acquires the main moving image file (step ST344), and distributes the main moving image file to the user terminal 5.

At the same time, the moving image contents provider server 3 stores distribution log of the main moving image file distributed last or information concerning the user to which the moving image is distributed in a distribution log managing section (step ST345). When there is a demand for distribution of another moving image, the moving image contents provider server 3 returns to step ST341, retrieves the other moving image, and distributes the other moving image to the user terminal 5. When there is no demand for another moving image, the processing procedure for distributing a moving image performed by the moving image contents provider server 3 is terminated.

The user terminal 5 sets titles of the distributed and the file information in the main file storing section 561 and the main moving image file information storing section 562 in the hard disk 52 together with the titles (step ST347).

When the user clicks (or double-clicks) a mouse on an icon for the main moving image file displayed on the screen, the information in the main moving image file is started by a computing section in the terminal 5 (step ST348). When the main moving image file is started, the computing section searches the hard disk 52 to determine whether the software 54 for reproduction is installed or not based on the reproduction software information stored in the file (step ST349).

Figure 10:
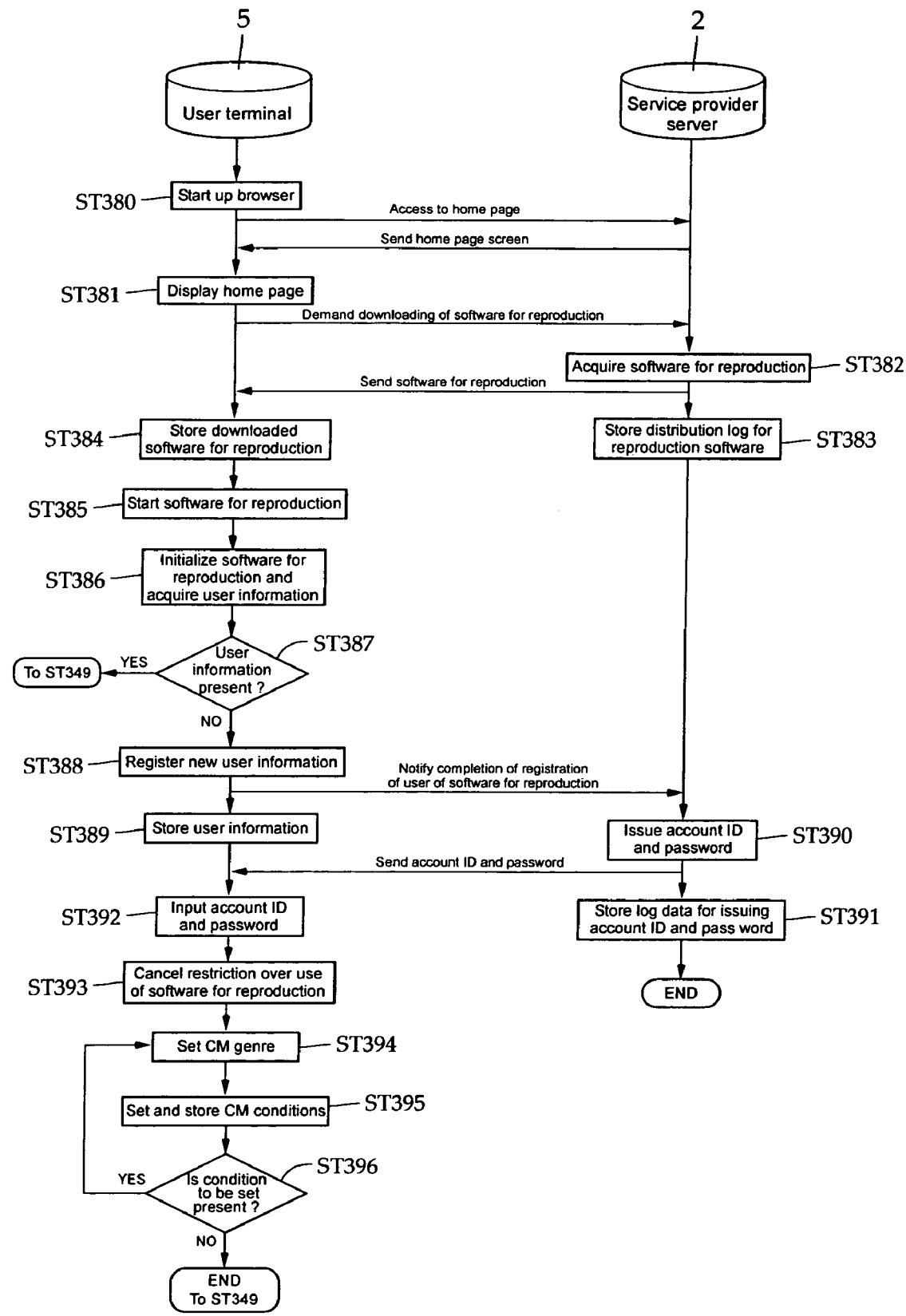
FIG. 10 is a flow chart explaining an example of the procedure for distributing the replaying software.

When it is determined by the computing section that the reproduction software 54 has not been installed, as shown in FIG. 10, a browser 55 in the user terminal 5 is automatically started based on the network information described in the file information (step ST380). The moving image contents provider server 3 accesses the homepage (service provider server 2 in this embodiment) described in the network information, and displays a homepage screen for downloading the reproduction software transmitted from the service provider server 2 (step ST381).

When the user issues a demand for downloading the reproduction software according to the contents displayed on the homepage, the service provider server 2 acquires the reproduction software from a reproduction software storing section not shown (step ST382), and sends the reproduction software to the user terminal 5.

The user terminal 5 having downloaded the reproduction software 54 stores the reproduction software 54 in the hard disk 52 (step ST384). In this embodiment, reproduction software 54 is distributed immediately after downloading in the state where the reproduction software 54 can be started up, but the reproduction software 54 may be installed anew, and there is not specific restriction over the distribution of the reproduction software 54.

Then the user terminal 5 starts the stored reproduction software 54 (step ST385). When an instruction for starting is received, the reproduction software 54 is once initialized, and the user terminal 5 accesses the user information storing section 543 provided therein to acquires the user information (step ST386). When it is determined that the user information is present (step ST387), namely when the reproduction software 54 is installed again, the user terminal 5 returns to step ST349 shown in FIG. 9 to prepare for distribution of the demanded moving image.

When it is determined that there is not the user information, namely that the user is a new one, the user terminal 5 shifts to a new user registration step (step ST388). In the new user registration step, at first, the user fills user information in entry columns displayed on the screen, and finally presses the registration complete button. With this operation, the new user information is stored in the user information storing section 543 in the reproduction software 54 (step ST389).

The reproduction software 54 confirms completion of the user registration, and sends a notification indicating completion of the registration is sent to the user certifying engine 210 in the service provider server 2. When the notification indicating completion of the registration is received, the user certifying engine 210 issues an instruction to the new user registering section 216, searches the account information storing section 217, issues a new account ID and a password (step ST390), and sends the account ID and the password to the reproduction software 54 via the user certifying engine 210.

The user certifying engine 210 stores the issued account information in the account information storing section 217, and stores the distribution log in the access log managing section 218 (step ST391). With this operation, the reproduction software distribution step in the service provider server 2 is finished. Distribution of the account information may be performed by the reproduction software in the on-demand state, or may be sent to a mail address included in the user information.

When the user having received the account information inputs the account information to an account information input section provided in the reproduction software (step ST392), the reproduction software determines whether the account information input by an count determining section not shown is valid or not, and when it is determined that the account information is valid, restriction applied to the reproduction software in use is cancelled (step ST393). When it is determined that the account information is invalid, the restriction over use of the reproduction software is continued. The restrictions over use of the reproduction software include, for instance, times of reproduction, and restriction over storage of the main moving image file.

When the restriction over use of the reproduction software is removed, the reproduction software 54 displays a screen for setting a type of CM desired by the user to be distributed or a genre of the moving image to be distributed, and the user sets desired CM information (step ST395), and stores the conditions in the user information storing section 543 (step ST396). When there is any set condition, the reproduction software 54 returns to step ST394, and sets required conditions. When it is determined that any conditions has not been set, the processing procedure for registering the user is finished, and the reproduction software 54 returns to step ST349 in FIG. 9 to prepare for distribution of the moving image.

A case where it is determined by the computing section that the reproduction software 54 is installed in the hard disk 52 is described below by again referring to FIG. 9. When it is determined that the reproduction software 54 is installed in the hard disk 52, the computing section automatically starts the reproduction software 54 to read the main moving image file (step ST350).

The reproduction software 54 reads the main moving image file information, accesses the moving image distributing engine 230 of the service provider server 2 based on network connection information (such as TCP/IP) of a service provider server incorporated in the file information or on file information for the slave file, and sends file information for the main moving image file demanded to be reproduced to the moving image distributing engine 230.

The moving image distributing engine 230 sends the received main moving image file information to the file information searching section 233, and the file information searching section 233 searches the slave moving image file storing section 231 for the demanded slave moving image file and also searches the slave moving image file information storing section 232 for the slave moving image file information to prepare for distribution of the moving image (step ST351).

When preparation for distribution is ready, the moving image distributing engine 230 issues a demand for transmission of user information to the reproduction software 54 in the user terminal 5. When the demand is received, the reproduction software 54 sends the user information from the user information storing section 543 to the moving image distributing engine 230.

When the user information is received, the moving image distributing engine 230 sends the user information and file information to the user information searching section 235. The user information searching section 235 having received the user information and file information searches for a CM moving image suited to the user information with the CM distributing engine 230, and also determines whether the selected CM moving image can be appended to the moving image file or not (step ST352).

When a distributable CM moving image is found, the user information searching section 235 issues a demand for distribution to the CM distributing engine 240, and acquired the CM moving image into the moving image distributing engine 230. At the same time, the CM moving image distributing engine 240 writes distribution log in the CM information storing section 243 (step ST353).

At first, the user information searching section 235 acquires the demanded slave moving image file from the slave moving image file storing section 231 (step ST354). The acquired slave moving image file is distributed to an encrypting section 236 and is encrypted there based on the CM moving image information (step ST355). It is to be noted that the CM moving image itself is not encrypted and is always reproducible.

In this embodiment, for encryption, each file is encoded by means of the exclusive logical sum (XOR) processing. The produced CM file and the slave moving image file are distributed from the moving image distributing engine 230 to the user terminal 5. The moving image distributing engine 230 having finished the task for distribution finally stores distribution log for the CM file in the distribution log managing section 237 (step ST356), also stores distribution log for the slave moving image file in the distribution log managing section 237 (step ST357), and then finishes the process sequence.

The reproduction software 54 having received the slave moving image file and the CM file at first reproduces the distributed CM moving image with a reproduction software 541 and displays the CM moving image on a monitor 53 of the user terminal 5 (step ST358).

Reproducing the CM moving image, the reproduction software 54 sends the CM information and slave moving image file information to the decoder 542, and also decodes the slave moving image file based on the file information for the CM moving image and by means of exclusive logical sum (XOR) (step ST359).

When reproduction of the CM moving image is finished, the reproduction software 54 sends the main moving image file and the slave moving image file to the decoder 542, and the decoder 542 decodes the main moving image file and the slave moving image file to reproducible moving image files (step ST360).

The reproduction software 54 sends the combined moving images successively to a reproducing section 541, and the reproducing section 541 reproduces the moving images by streaming (step ST361). The reproduction software 54 continues to reproduce the moving images, and terminates reproduction of the moving images when prespecified conditions for termination of distribution are satisfied (step ST362), and again reproduces Is the CM moving image 363, and then terminates the process sequence for reproducing the moving images 363.

When it is determined that the conditions for termination of reproduction are not satisfied, the reproduction software 54 returns to ST359 and continues to reproduce the moving images by streaming. An example of the condition for terminating reproduction is, for instance, that a final frame of the moving image is reproduced.

In this embodiment, the CM moving image reproduced after completion of reproduction of a moving image is the one reproduced first, but a CM moving image different from the first one may be reproduced by streaming.

In this embodiment, a main moving image file is previously stored in the user terminal 5 and is reproduced by streaming distributing a slave moving image file also by streaming, but the configuration is allowable in which both the main and slave moving image files may simultaneously be reproduced by streaming.

In this embodiment, a main moving image file is stored in the moving image contents provider server 3, and management of the main moving image file is performed by the moving image contents provider, but both of the main and slave moving image files may be stored in the service provider server 2 and the moving image files may be managed by the service provider server 2 in batch. Also the embodiment as described above is included in the present invention.

Figure 11:
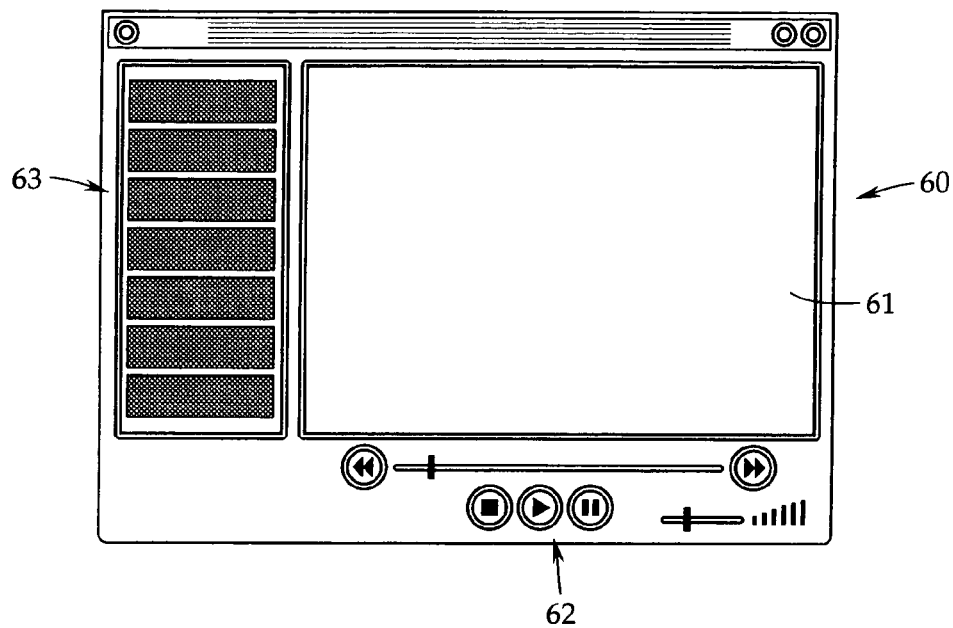
FIG. 11 is a schematic view of a replaying window displayed by the replaying software.

More specific configuration of the reproduction software 45 is described below. As shown in FIG. 11, when the reproduction software 54 is started, a reproduction window 60 is displayed on the monitor. The reproduction window 60 has a display section 61 for reproducing a moving image provided at the center, and also a control section 62 for controlling reproduction of a moving image is provided under the display section 61.

In this embodiment, a reproduction button, stop button, a halt button, a fast feed button, a rewind button, and a volume control lever are provided in the control section 62.

A multi-window 63 displaying information concerning a moving image being displayed is provided next to the displaying section 61. The multi-window 63 shows, in addition to the information concerning a moving image being displayed (such as a title and a copyright), for instance, a link button for a homepage relating to contents of the CM being provided. As described above, all information concerning a moving image may be displayed in the multi-window 63.

In this embodiment, the reproduction window 60 comprises a window independently formed on a top screen of the monitor 53 of the user terminal 5, but the moving image distribution program according to the present invention may be incorporated, for instance, in a WWW browser as a plug-in for the WWW browser. In this case, the reproduction window 60 is displayed in a display window of the browser. Also the embodiment as described above is included in the present invention.

Figure 12:
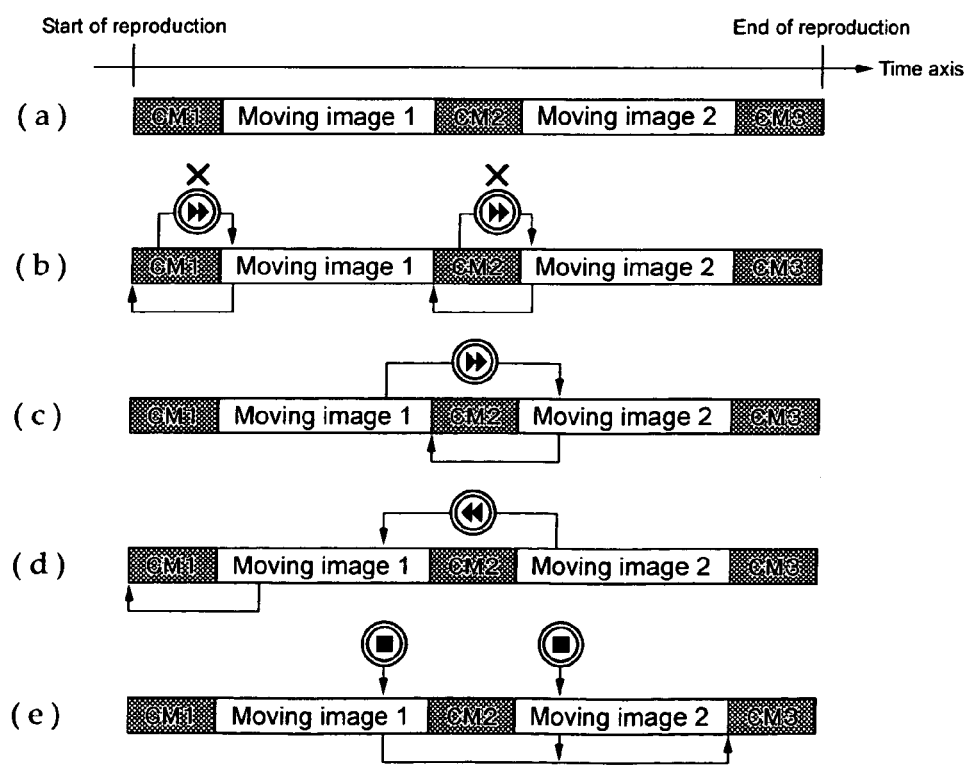
FIG. 12 is a schematic diagram explaining the procedure for replaying the moving image and an example of restrictions thereof.
Figure 13:
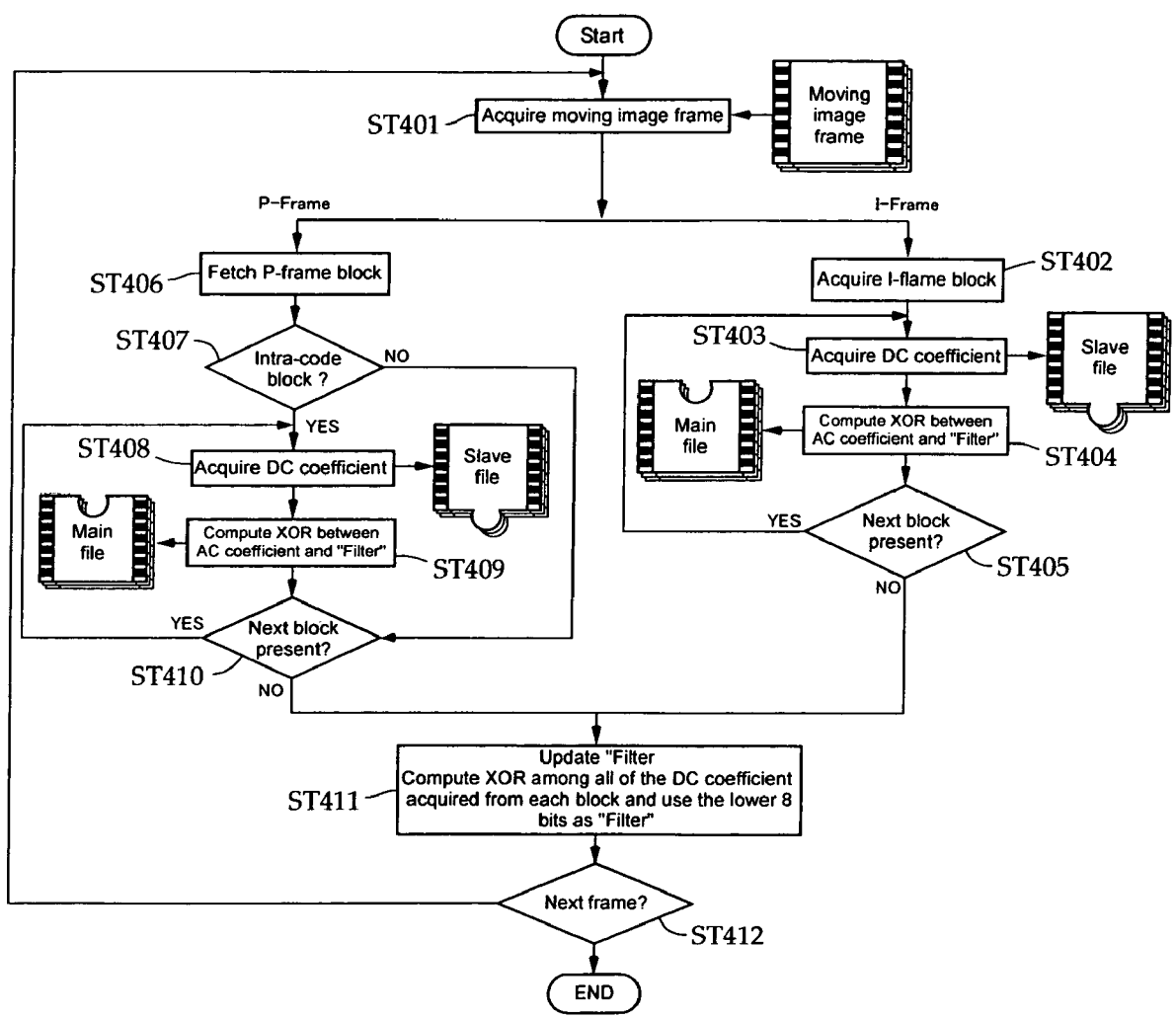
FIG. 13 is a flow chart indicating the flow of dividing the moving image with a moving image dividing system with another aspect of the present invention.

A method of reproducing a moving image is described with reference to FIG. 12. In this embodiment, description is provided for a case in which two moving images, namely "moving image 1" and "moving image 2", and three CM moving images "CM1", "CM2", and "CM3" are reproduced. When a user hopes to view the "moving image 1" and "moving image 2" free of charge, the user is required to view a CM moving image.

In the ordinary flow of operation for reproducing a moving image, as shown in FIG. 12A, at first the "CM1" is reproduced and then the "moving image 1" is reproduced, and after reproduction of the "moving image 1" is finished, the "CM2" is reproduced. After reproduction of the "CM2", the "moving image 2" is reproduced, and after reproduction of the "moving image 2", finally the "CM3" is reproduced, and then the process sequence for reproducing the moving images is finished. In this process sequence, the user is required to view CM moving images before and after reproduction of each moving image.

As shown in FIG. 12B, during reproduction of a CM moving image, it is preferable to disable operation of the fast feed button on the control section 62 of the reproduction window 60. With this function, it is possible to prevent a viewer from skipping a CM moving image for directly viewing a moving image.

As shown in FIG. 12C, when the fast feed button is operated to immediately view the "moving image 2" after the end of the "moving image 1", the "CM2" should be reproduced before start of reproduction of the "moving image 2", which is preferable to the sponsor.

Also when returning from the "moving image 2" to the "moving image 1", the "CM1" should be reproduced before start of reproduction of the "moving image 1" as shown in FIG. 12D, which is preferable to the sponsor.

When reproduction is terminated during reproduction of the "moving image 1" or "moving image 2", the "CM3" to be provided finally is not viewed. To overcome this problem, when the stop button is operated during reproduction of a moving image, reproduction of the "CM3" is forcefully reproduced as shown in FIG. 12D.

Figure 9:
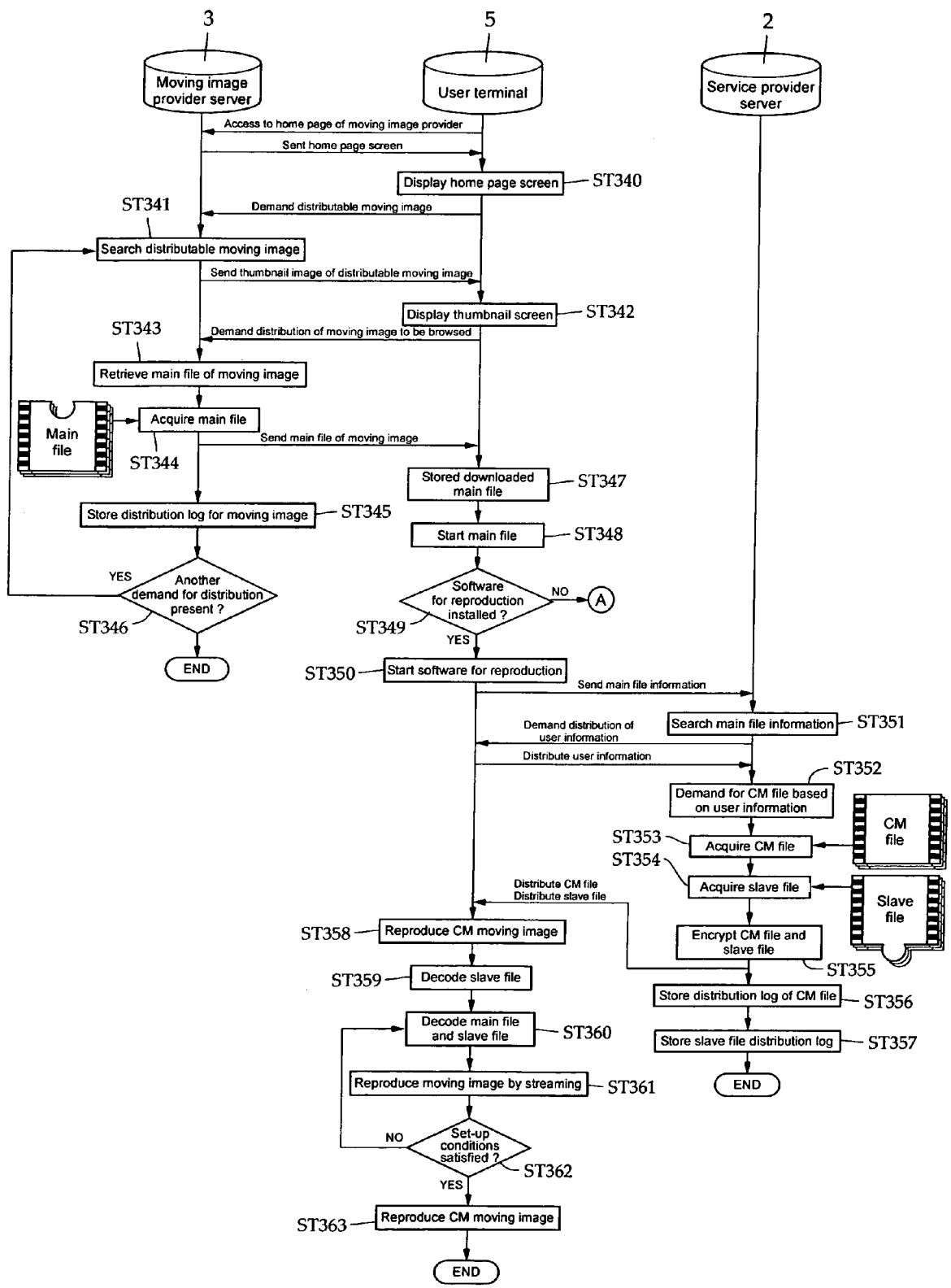
FIG. 9 is a flow chart indicating an example of the moving image distribution procedure in the service provider server, the moving image contents provider server, and the user terminal with the moving image distribution system described above.

More specifically, by setting the requirements at step ST362 shown in FIG. 9, a condition for reproduction of each moving image can be specified.

Furthermore, it is possible to terminate reproduction of the reproduction software without waiting for reproduction of the "CM3" by forcefully terminating the reproduction window 60. In this case, contents of the "CM3" may temporally be stored within the reproduction software and then reproduced as a "CM1" when the moving image is reproduced next time.

Description of the embodiment above assumes a case in which the user terminal 5 is a personal computer, but the user terminal 5 is not limited to a personal computer, and a mobile telephone, a PDA (Personal Digital Assistance) and other various types of information terminals mounted in a vehicle or a train, and furthermore an audio visual device such as a game machine or a television may be used as the user terminal 5 on the condition that the device can be appended to the network.

Furthermore an accounting system may separately be provided for demanding, after distribution of a moving image, an advertisement fee to a sponsor in cooperation with the distribution log managing section 237. In this case, the configuration is allowable in which times of distribution of each moving image or a total reproduction time is counted and the fee is automatically counted according to an estimation previously presented to the sponsor.

The invention claimed is:

1. A moving image distribution system for distributing a prespecified moving image to a user terminal connected to the system via a network, said system comprising:
 a moving image dividing unit for dividing said moving image into two not-reproducible moving image files along the time axis;
 an encrypting unit for encrypting one of the divided moving image files by CM file data separated from the moving image and selected as desired, said CM file data including a prespecified CM element incorporated therein;
 a moving image distributing unit for distributing to the user terminal one of the encrypted moving image file with the CM file data in response to a request for reproduction from the user terminal previously storing therein the other divided moving image file; and
 a reproducing unit for decrypting the encrypted moving image file and the other divided moving image file distributed to the user terminal by using the CM file data and reproducing the decrypted files.

2. The moving image distribution system according to claim 1, wherein said moving image dividing unit compresses data for the moving image file so that a total of file capacities of the two moving image files is smaller than a file capacity for the moving image, and also divides the moving image so that a file capacity of said main moving image file is larger than that of said slave moving image file.

3. The moving image distribution system according to claim 1, wherein said encrypting unit computes an exclusive logical sum of a data bit array for said CM file and a data bit array for said divided moving image file and encrypts for encrypting said moving image file.

4. The moving image distribution system according to claim 1, further comprising:
 a user information storing section for storing therein various types of user information concerning users including service providers, users, moving image contents providers, and sponsors; and
 a user certifying engine for certifying access to said service provider server based on said user information, wherein said moving image dividing unit acknowledges a demand for dividing said moving image only when a user is authenticated as the service provider or the moving image contents provider by said user certifying engine.

5. The moving image distribution system according to claim 1, wherein said reproducing unit comprises a decoder for decoding said main moving image file and said slave moving image file both not-reproducible to said reproducible moving image, and a decrypting unit for decrypting one of said encrypted moving image files together with the CM file again by executing the exclusive logical sum processing, and
 said reproducing unit decrypts said CM file and said moving image files by said decrypting unit after checking that the said CM file has been reproduced, and starts up said decoder to decode said main moving image file and said slave moving image file to said reproducible moving image.

6. The moving image distribution system according to claim 5, wherein said service provider server comprises a reproducing unit storing section for storing therein said reproducing unit, and executes a processing procedure comprising a searching step of searching, when a demand for reproduction of said main moving image file is received from said user terminal, whether said reproducing unit is present on said user terminal or not, and said reproducing unit is distributed to said user terminal when it is determined in the searching step that there is no reproducing unit on said user terminal.

7. The moving image distribution system according to claim 5, wherein said reproducing unit further comprises a user information storing section for storing therein user information concerning said user, and distributes said user information to said user information storing section in said service provider server in response to a demand from an user certifying engine.

8. The moving image distribution system according to claim 1, wherein said moving image files do not include the CM file data, and said one of the divided moving image files is encrypted by the CM file data not included in the moving image files.

9. A moving image distribution system for distributing a prespecified moving image to a user terminal connected to the system via a network,
 said system having a service provider server comprising a moving image dividing unit for dividing said moving image into two not-reproducible moving image files including a main moving image file and a slave moving image file along a time axis; a main moving image file storing section for storing therein said main moving image file; a slave moving image file storing section for storing therein said slave moving image file; a CM file storing section for storing therein a CM file including a prespecified CM element incorporated therein; and an encrypting unit for encrypting either one of said main moving image file and said slave moving image file by CM file data stored in the CM file storing section and selected as desired, wherein said service provider server receives a demand for distributing said moving image from said user terminal, summons said main moving image file corresponding to said moving image from said main moving image file storing section, and distributes said main moving image file to the user terminal, said service provider server receives a demand for reproducing said main moving image file from said user terminal, summons said slave moving image file corresponding to said main moving image file and said CM file from said slave moving image file storing section and said CM file storing section, encrypts said slave moving image file by said CM file data, and distributes the encrypted slave moving image file to said user terminal together with said CM file, and said user terminal decrypts two of said distributed moving image files and said CM file with a prespecified reproducing unit and reproduces said moving image files.

10. The moving image distribution system according to claim 9, wherein said service provider server furthermore comprises a CM file summoning unit for summoning said CM file from said CM file storing section based on said user information, and said CM file summoning unit selects a CM file demanded by the user from the CM file storing section based on the user information and provides the CM file to said encrypting unit.

11. A moving image distribution system for distributing a prespecified moving image to a user terminal connected to the system via a network, said system comprising:

a moving image contents provider server having said moving image, a sponsor server having a CM file with a prespecified advertisement element therein, and a service provider server having a moving image dividing unit for dividing said moving image into two not-reproducible moving image files including a main moving image file and a slave moving image file along a time axis, said moving image contents provider server having a main moving image file storing section for storing the main moving image file obtained after division by said moving image dividing unit, said service provider server having a slave moving image file storing section for storing therein the slave moving image file obtained after division by said moving image dividing unit, an encrypting unit for encrypting either one of said main moving image file and said slave moving image file by CM file data separated from the main moving image file and the slave moving image file and selected as desired, and a CM file storing section for storing therein said CM moving image distributed from the sponsor server, wherein said moving image contents provider server receives a demand for transmitting said moving image from said user terminal, summons said main moving image file corresponding to said moving image from said main moving image file storing section, and distributes said main moving image file to said user terminal, said service provider server receives a demand for reproducing said main moving image file from said user terminal and summons said slave moving image file corresponding to said main moving image file and said CM file from said slave moving image file storing section of said service provider server and said CM file storing section, and said service provider further encrypts said slave moving image file through said encrypting unit by the selected CM file data, and distributes the encrypted slave moving image file to said user terminal together with said CM file, and said user terminal decrypts two of the distributed moving image files and said CM file by a prespecified reproducing unit and reproduces said moving image files.

12. A computer-readable medium encoded with a moving image distribution program for a moving image distribution system to distribute a prespecified moving image to a user terminal via a network, said program comprising:

a moving image dividing step of dividing said moving image into two not-reproducible moving image files along the time axis;

an encrypting step of encrypting one of said divided two moving image files by CM file data separated from the moving image and selected as desired, said CM file data including a prespecified CM element incorporated therein;

a moving image distributing step of distributing, in response to a demand for reproduction from said user terminal previously storing therein the other of the moving image files, or the one of said moving image files with said CM file to said user terminal, a decrypting step for decrypting said two moving image files distributed to said user terminal by said CM file data, and a reproducing step for reproducing said decrypted two moving image files.

13. A recording medium, comprising the moving image dividing program according to claim 12.

14. A moving image distribution system for distributing a prespecified moving image to a user terminal connected to the system via a network, said system comprising: a service provider server, wherein said service provider server comprises:

a moving image dividing unit for dividing a moving image distributed from a moving image contents provider into two not-reproducible moving image files including a main moving image file and a slave moving image file along a time axis, an encrypting unit for encrypting either one of the divided moving image files by said moving image dividing unit by CM file data separated from the moving image and selected as desired, said CM file data being distributed from a sponsor, and a moving image distributing unit for distributing either one of the encrypted moving image files to said user terminal together with said CM file, wherein said service provider server distributes said moving image file with said CM file to said user terminal and also presents a CM advertisement fee associated with distribution of said moving image file to said sponsor.

15. A moving image distribution system for distributing a prespecified moving image to a user terminal connected to the system via a network, said system comprising:

a moving image contents provider server storing therein said moving image;

a sponsor server storing therein a CM file with a prespecified advertisement element therein; and a service provider server having: a moving image dividing unit for dividing said moving image into two not-reproducible moving image files including a main moving image file and a slave moving image file along a time axis; and an encrypting unit for encrypting either one of the divided moving image files by said moving image dividing unit by CM file data separated from the moving image and selected as desired, said CM file data being distributed from said sponsor; and a moving image distributing unit for distributing said either one of the encrypted moving image files to said user terminal together with said CM file, wherein said service provider server further comprises a CM management engine including: a counting section for counting number of times of distribution of either one or both of said main and slave moving image files; a CM distribution managing section for managing log data for distribution of said CM file distributed together with said moving image file; and a CM information preparing section for computing distribution information for said CM file according to the number of times of distribution of said CM file and the distribution log data; and said counting section counts the number of times of distribution of said distributed moving image contents in response to a demand for distribution from said user terminal; said CM information preparing section summons the number of times of counting from said counting section, and said distribution data from said CM distribution managing section at the same time, and prepares CM distribution information from said number of times of counting and the distribution data and notifies said moving image contents provider and/or said sponsor server of said CM distribution information.

* * * * *